United States Patent
Yi et al.

(10) Patent No.: US 10,055,650 B2
(45) Date of Patent: Aug. 21, 2018

(54) VEHICLE DRIVING ASSISTANCE DEVICE AND VEHICLE HAVING THE SAME

(71) Applicant: LG ELECTRONICS INC., Seoul (KR)

(72) Inventors: Chuho Yi, Seoul (KR); Youngkyung Park, Seoul (KR); Mullaguru Sanjeevu, Karnataka (IN); Rachabattuni Vijay, Karnataka (IN); Reddy Yarram Naresh, Karnataka (IN)

(73) Assignee: LG Electronics Inc. (KR)

( * ) Notice: Subject to any disclaimer, the term of this patent is extended or adjusted under 35 U.S.C. 154(b) by 7 days.

(21) Appl. No.: 15/108,103

(22) PCT Filed: Dec. 24, 2014

(86) PCT No.: PCT/KR2014/012852
§ 371 (c)(1),
(2) Date: Jun. 24, 2016

(87) PCT Pub. No.: WO2015/099465
PCT Pub. Date: Jul. 2, 2015

(65) Prior Publication Data
US 2016/0328619 A1  Nov. 10, 2016

(30) Foreign Application Priority Data
Dec. 24, 2013 (KR) .................... 10-2013-0162822

(51) Int. Cl.
*G06K 9/00* (2006.01)
*B60W 10/04* (2006.01)
(Continued)

(52) U.S. Cl.
CPC ......... *G06K 9/00798* (2013.01); *B60W 10/04* (2013.01); *B60W 10/18* (2013.01);
(Continued)

(58) Field of Classification Search
None
See application file for complete search history.

(56) References Cited

U.S. PATENT DOCUMENTS

| 7,046,822 B1* | 5/2006 | Knoeppel | B60W 30/16 348/169 |
|---|---|---|---|
| 2007/0179697 A1* | 8/2007 | Holler | B60T 7/22 701/70 |

(Continued)

FOREIGN PATENT DOCUMENTS

| DE | 10117237 | 10/2001 |
|---|---|---|
| EP | 1901259 | 3/2008 |

(Continued)

OTHER PUBLICATIONS

Extended European Search Report in European Application No. 14874800.7, dated Jun. 16, 2017, 11 pages (with English translation).

(Continued)

*Primary Examiner* — Hadi Akhavannik
(74) *Attorney, Agent, or Firm* — Fish & Richardson P.C.

(57) ABSTRACT

The present invention relates to a vehicle driving assistance device and a vehicle having same. The vehicle driving assistance device according to an embodiment of the present invention comprises: a stereo camera; an interface unit exchanging data with at least one device inside a vehicle; and a processor performing lane detection for a first region in front of the vehicle based on a stereo image received from the stereo camera, and deducing lanes for a second region in front of the vehicle based on map information from an interface unit. Accordingly, the lanes in front of a vehicle can be perceived based on a captured image.

17 Claims, 32 Drawing Sheets

(51) Int. Cl.
*B60W 10/18* (2012.01)
*B60W 10/20* (2006.01)
*B60W 10/22* (2006.01)
*B60W 30/12* (2006.01)
*G06T 7/11* (2017.01)
*G06T 7/194* (2017.01)
*G06T 7/12* (2017.01)
*G06T 7/174* (2017.01)

(52) U.S. Cl.
CPC ............ *B60W 10/20* (2013.01); *B60W 10/22* (2013.01); *B60W 30/12* (2013.01); *G06K 9/00805* (2013.01); *G06T 7/11* (2017.01); *G06T 7/12* (2017.01); *G06T 7/174* (2017.01); *G06T 7/194* (2017.01); *B60W 2420/42* (2013.01); *B60W 2550/14* (2013.01); *B60W 2720/24* (2013.01); *G06T 2207/10021* (2013.01); *G06T 2207/10024* (2013.01); *G06T 2207/30256* (2013.01); *G06T 2207/30261* (2013.01)

(56) References Cited

U.S. PATENT DOCUMENTS

2008/0055114 A1* 3/2008 Kim .................... B60R 1/00
340/937
2012/0140039 A1* 6/2012 Ota ...................... B60W 30/12
348/46
2012/0253596 A1* 10/2012 Ibrahim ............. G06K 9/00798
701/36
2015/0054638 A1 2/2015 Ogawa et al.

FOREIGN PATENT DOCUMENTS

| JP | 2007-533541 | 11/2007 |
| KR | 10-2009-0064946 B1 | 6/2009 |
| KR | 10-1030211 B1 | 4/2011 |
| KR | 10-2012-0039852 | 4/2012 |
| KR | 10-2012-0051544 B1 | 5/2012 |
| KR | 10-2012-0062393 B1 | 6/2012 |
| KR | 10-1163042 B1 | 7/2012 |
| WO | 2013129470 | 9/2013 |

OTHER PUBLICATIONS

Tsogas et al., "Using digital maps to enhance lane keeping support systems," Intelligent Vehicles Symposium, Jun. 2007, pp. 148-153 (XP031126936).
Nedevschi et al., "3D Lane Detection System Based on Stereovision," IEEE Intelligent Transportation Systems, Oct. 2004, pp. 161-166 (XP010772247).
International Search Report dated Apr. 24, 2015 for Application No. PCT/KR2014/012852, 4 pages.

\* cited by examiner

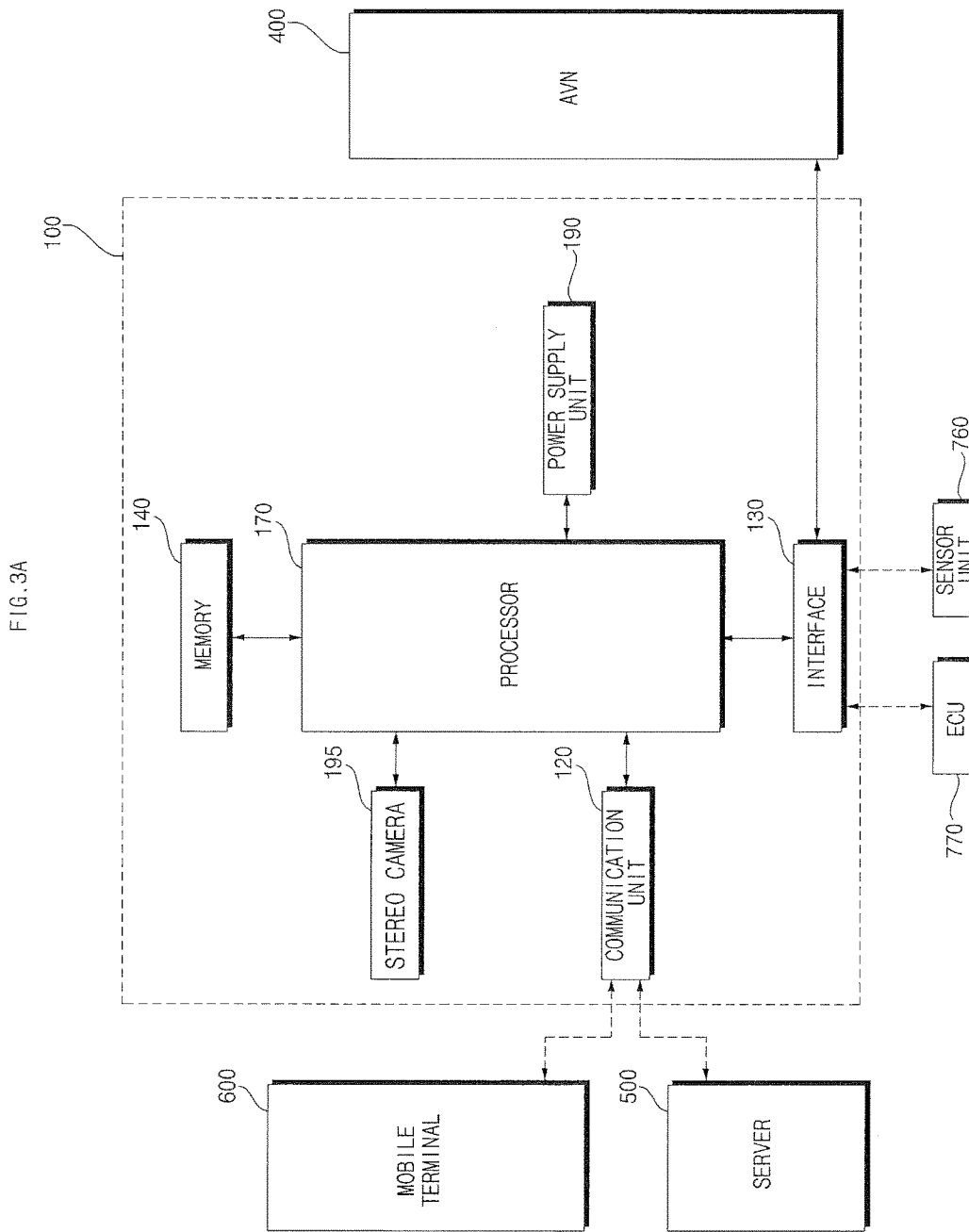

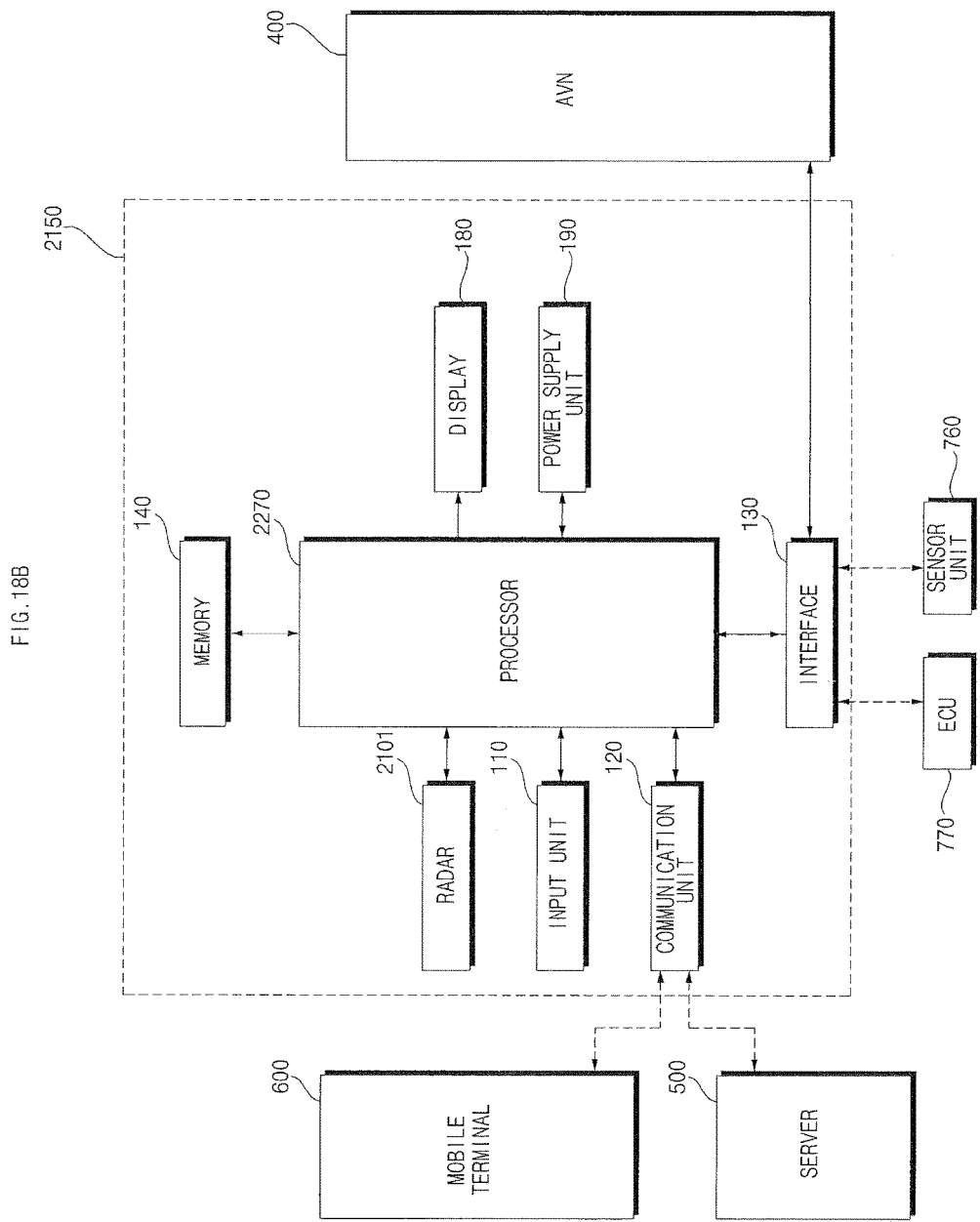

VEHICLE DRIVING ASSISTANCE DEVICE AND VEHICLE HAVING THE SAME

CROSS REFERENCE TO RELATED APPLICATIONS

This application is a U.S. National Phase Application under 35 U.S.C. § 371 of International Patent Application No. PCT/KR2014/012852, filed on Dec. 24, 2014, which claims the benefit of Korean Patent Application No. 10-2013-0162822, filed on Dec. 24, 2013, the entire contents of which are hereby incorporated by reference in their entireties.

TECHNICAL FIELD

The present invention relates to a vehicle driving assistance device and a vehicle having the same, and more particularly, to a vehicle driving assistance device capable of confirming a lane located at a front side of a vehicle based on captured images, and a vehicle having the same.

BACKGROUND

A vehicle is an apparatus that allows a user who rides therein to drive the apparatus in a desired direction. A representative example of the vehicle may be an automobile.

Meanwhile, for convenience of the user who uses the vehicle, the vehicle is provided with, for example, various sensors and electronic devices. In particular, for example, various devices for user driving convenience are being developed.

SUMMARY

An object of the present invention devised to solve the problem lies in a vehicle driving assistance device capable of confirming a lane located at a front side of a vehicle based on captured images, and a vehicle having the same.

In accordance with one embodiment of the present invention, the above and other objects can be accomplished by providing a vehicle driving assistance device including a stereo camera, an interface to exchange data with at least one device provided inside a vehicle, and a processor to detect a lane of a first area located at a front side of the vehicle based on stereo images received from the stereo camera and to estimate a lane of a second area located at a front side of the vehicle based on map information from the interface.

In accordance with another embodiment of the present invention, the above and other objects can be accomplished by providing a vehicle driving assistance device including a mono camera, a radar, an interface to exchange data with at least one device provided inside a vehicle, and a processor to detect a lane of a first area located at a front side of the vehicle based on a mono image received from the mono camera and distance information from the radar and to estimate a lane of a second area located at a front side of the vehicle based on map information from the interface.

In accordance with another embodiment of the present invention, the above and other objects can be accomplished by providing a vehicle driving assistance device including a Lidar to scan an external object, an interface to exchange data with at least one device provided inside a vehicle, and a processor to detect a lane of a first area located at a front side of the vehicle based on a scanned image received from the Lidar and to estimate a lane of a second area located at a front side of the vehicle based on map information from the interface.

In accordance with one embodiment of the present invention, the above and other objects can be accomplished by providing a vehicle including a sensor unit to sense a vehicle state, a steering drive unit to drive a steering apparatus, a brake drive unit to drive a brake apparatus, a power source drive unit to drive a power source, a suspension drive unit to drive a suspension apparatus, a controller to control the steering drive unit, the brake drive unit, the power source drive unit and the suspension drive unit, and a vehicle driving assistance device including a stereo camera, an interface to exchange data with at least one device provided inside a vehicle, and a processor to detect a lane of a first area located at a front side of the vehicle based on stereo images received from the stereo camera and to estimate a lane of a second area located at a front side of the vehicle based on map information from the interface.

BRIEF DESCRIPTION OF THE DRAWINGS

FIGS. 3A to 3B are block diagrams showing various examples of the internal configuration of a vehicle driving assistance device according to one embodiment of the present invention.

FIG. 18B is a block diagram showing the internal configuration of a vehicle driving assistance device according to another embodiment of the present invention.

DETAILED DESCRIPTION

Hereinafter, the embodiments disclosed in the present specification will be described in detail with reference to the accompanying drawings.

With respect to constituent elements used in the following description, suffixes "module" and "unit" are given or mingled with each other only in consideration of ease in preparation of the specification, and do not have or serve as different meanings.

A vehicle as described in this specification may include an automobile and a motorcycle. Hereinafter, an automobile will be focused upon.

A vehicle as described in this specification may include all of a vehicle including an engine, a hybrid vehicle including both an engine and an electric motor, and an electric vehicle including an electric motor. Hereinafter, a vehicle including an engine will be focused upon.

A vehicle driving assistance device as described in this specification may be referred to as an advanced driver assistance system (ADAS) or an advanced driver assistance apparatus (ADAA). Hereinafter, a vehicle driving assistance device and a vehicle having the same according to various embodiments of the present invention will be described.

Figure 1:
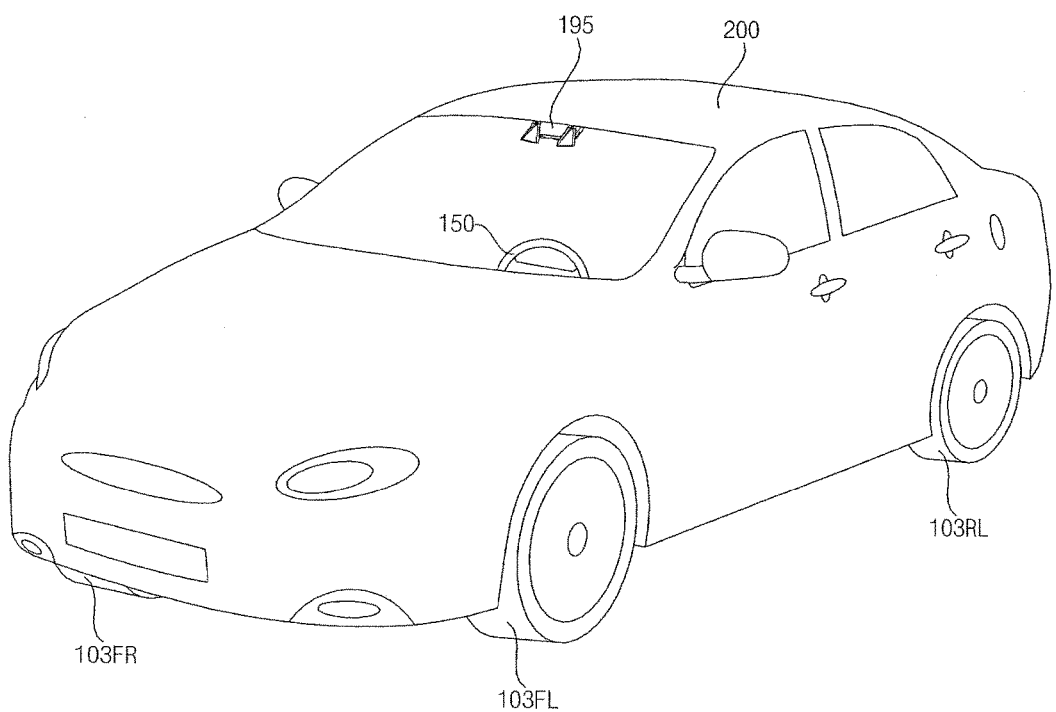
FIG. 1 is a diagram showing the appearance of a vehicle including a stereo camera according to one embodiment of the present invention.

FIG. 1 is a diagram showing the appearance of a vehicle including a stereo camera according to one embodiment of the present invention.

Referring to the figure, a vehicle 200 may include wheels 103FR, 103FL, 103RL, . . . rotated by a power source, a steering wheel 150 for controlling the direction of travel of the vehicle 200, and a stereo camera 195 provided inside the vehicle 200.

The stereo camera 195 may include a plurality of cameras and stereo images acquired by the plurality of cameras may be processed in the vehicle driving assistance device (100 of FIG. 3).

In the figure, the stereo camera 195 includes two cameras.

Figure 2:
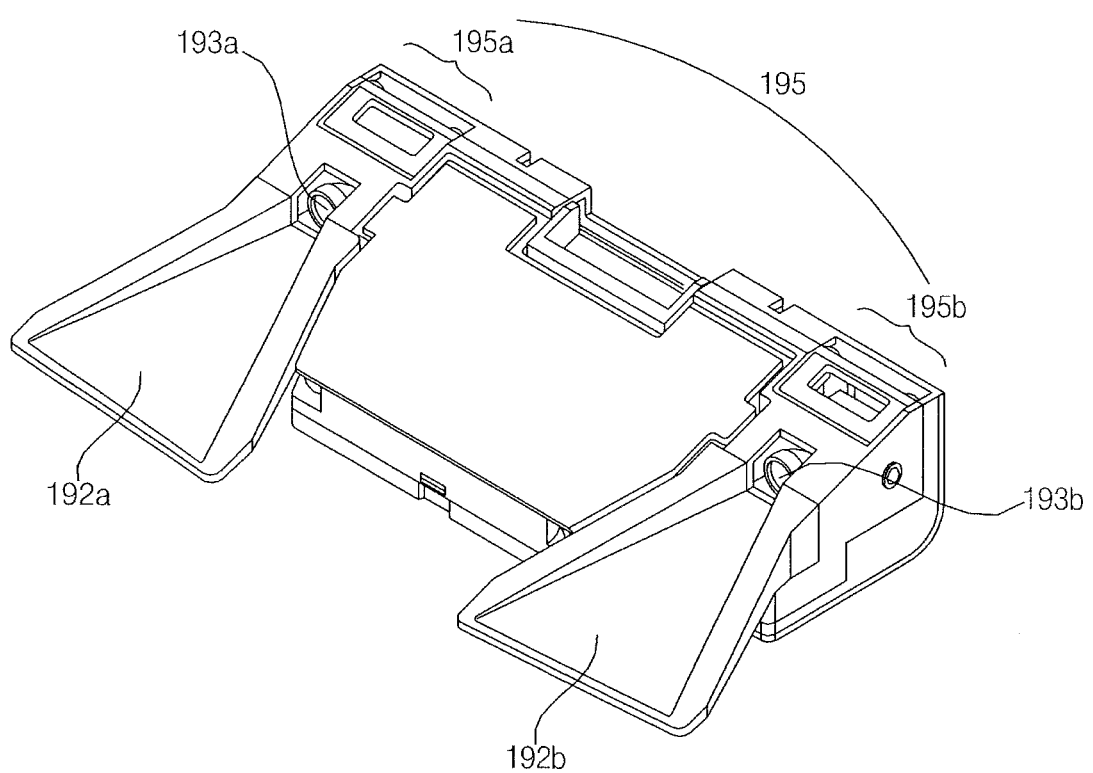
FIG. 2 is a diagram showing the appearance of the stereo camera attached to the vehicle of FIG. 1.

FIG. 2 is a diagram showing the appearance of the stereo camera attached to the vehicle of FIG. 1.

Referring to the figure, the stereo camera module 195 may include a first camera 195a including a first lens 193a and a second camera 195b including a second lens 193b.

The stereo camera module 195 may include first and second light shield units 192a and 192b for shielding light incident on the first and second lenses 193a and 193b.

The stereo camera module 195 of the figure may be attached to and detached from a ceiling or windshield of the vehicle 200.

The vehicle driving assistance device (100 of FIG. 3) including such a stereo camera module 195 may acquire stereo images of the front side of the vehicle from the stereo camera module 195, perform disparity detection based on the stereo images, perform object detection with respect to at least one stereo image, and continuously track motion of an object after object detection.

Figure 3B:
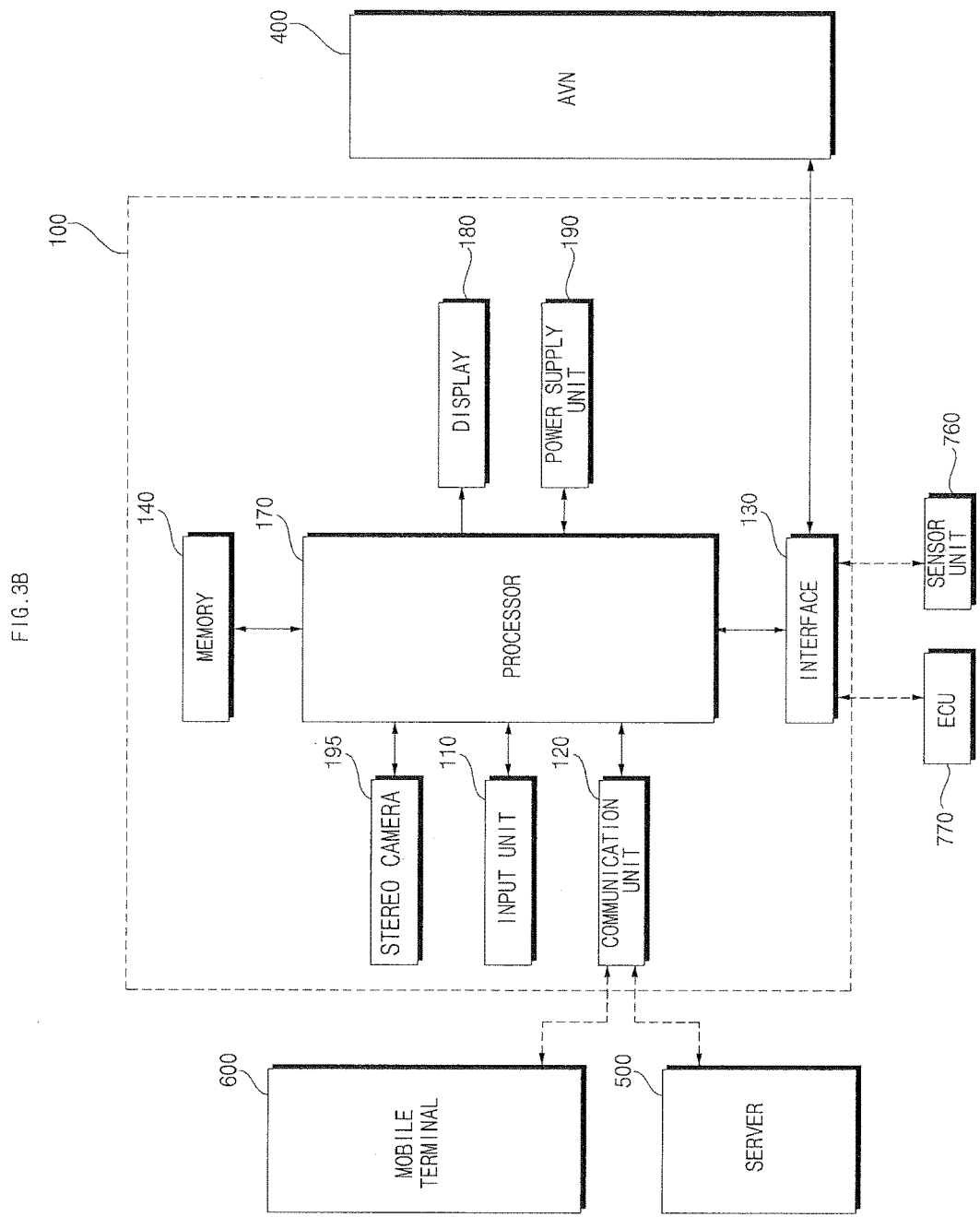

FIGS. 3A to 3B are block diagrams showing various examples of the internal configuration of a vehicle driving assistance device according to one embodiment of the present invention.

The vehicle driving assistance device 100 of FIGS. 3A to 3B may process stereo images received from the stereo camera 195 based on computer vision and generate vehicle related information. Here, the vehicle related information may include vehicle control information for direct control of the vehicle or vehicle driving assistance information for providing a driving guide to a driver.

First, referring to FIG. 3A, the vehicle driving assistance device 100 of FIG. 3A may include a communication unit 120, an interface 130, a memory 140, a processor 170, a power supply unit 190 and a stereo camera 195. In addition, an audio input unit (not shown) and an audio output unit (not shown) may be further included.

The communication unit 120 may exchange data with a mobile terminal 600 or a server 500 in a wireless manner. In particular, the communication unit 120 may exchange data with the mobile terminal of the driver in a wireless manner. The wireless communication method may include various data communication methods such as Bluetooth, Wi-Fi Direct, Wi-Fi or APiX.

The communication unit 120 may receive weather information and road traffic state information, e.g., Transport Protocol Experts Group (TPEG) information, from the mobile terminal 600 or the server 500. In the vehicle driving assistance device 100, real-time traffic information obtained based on the stereo images may be transmitted to the mobile terminal 600 or the server 500.

When a user gets into the vehicle 200, the mobile terminal 600 of the user and the vehicle driving assistance device 100 may pair with each other automatically or as the user executes an application.

The interface 130 may receive vehicle related data or transmit signals processed or generated in the processor 170 to an external device. The interface 130 may perform data communication with an ECU 770, an audio video navigation (AVN) apparatus 400 and a sensor unit 760 using a wired or wireless communication method.

The interface 130 may receive map information related to vehicle traveling through data communication with the AVN apparatus 400.

The interface 130 may receive sensor information from the ECU 770 or the sensor unit 760.

The sensor information may include at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, etc.

Such sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tier sensor, a steering sensor based on rotation of the steering wheel, a vehicle interior temperature sensor, a vehicle interior humidity sensor, etc. The position module may include a GPS module for receiving GPS information.

Information related to vehicle traveling, such as vehicle direction information, vehicle position information, vehicle angle information, vehicle speed information and vehicle tilt information, may be referred to as vehicle traveling information.

The memory 140 may store a variety of data for overall operation of the vehicle driving assistance device 100, such as a program for processing or control of the processor 170.

An audio output unit (not shown) converts an electrical signal from the processor 170 into an audio signal and outputs the audio signal. The audio output unit may include a speaker. The audio output unit (not shown) may output sound corresponding to operation of the input unit 110, that is, a button.

An audio input unit (not shown) may receive user voice and may include a microphone. The received voice may be converted into an electrical signal and the electrical signal may be delivered to the processor 170.

The processor 170 controls overall operation of the units of the vehicle driving assistance device 100.

In particular, the processor 170 performs signal processing based on computer vision. The processor 170 acquires the stereo images of the front side of the vehicle from the stereo camera 195, performs disparity calculation with respect to the front side of the vehicle based on the stereo images, performs object detection with respect to at least one of the stereo images based on the calculated disparity information, and continuously tracks motion of an object after object detection.

In particular, the processor 170 may perform lane detection, peripheral vehicle detection, pedestrian detection, traffic sign detection, road surface detection, etc. upon object detection.

The processor 170 may calculate a distance from a detected peripheral vehicle, the speed of the detected peripheral vehicle, a speed difference with the detected peripheral vehicle, etc.

The processor 170 may receive weather information and road traffic state information, e.g., Transport Protocol Experts Group (TPEG) information, through the communication unit 120.

The processor 170 may confirm the traffic condition information in real time based on the stereo images in the vehicle driving assistance device 100.

The processor 170 may receive map information from the AVN apparatus 400 through the interface 130.

The processor 170 may receive sensor information from the ECU 770 or the sensor unit 760 through the interface 130. The sensor information may include at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, etc.

The power supply unit 190 may supply power required to operate the respective components under the control of the controller 170. In particular, the power supply unit 190 may receive power from, for example, a battery (not illustrated) inside the vehicle 200.

The stereo camera 195 may include a plurality of cameras. Hereinafter, as described with reference to FIG. 2, the stereo camera 195 includes two cameras.

The stereo camera 195 may be attached to or detached from the ceiling or windshield of the vehicle 200 and may include a first camera 195*a* including a first lens 193*a* and a second camera including a second lens 193*b*.

The stereo camera 195 may include first and second light shield units 192*a* and 192*b* for shielding light incident on the first and second lenses 193*a* and 193*b*.

Next, referring to FIG. 3B, the vehicle driving assistance device 100 of FIG. 3B may further include an input unit 110 and a display 180, as compared to the vehicle driving assistance device 100. Hereinafter, only the input unit 110 and the display 180 will be described.

The input unit 110 may include a plurality of buttons or a touchscreen attached to the vehicle driving assistance device 100 and, more particularly, the stereo camera 195. Through the plurality of buttons or the touchscreen, the vehicle driving assistance device 100 may be powered on. In addition, a variety of input operations may be performed.

The display 180 may display an image related to operation of the vehicle driving assistance device. For image display, the display 180 may include a cluster or a head up display (HUD) located at the internal front side of the vehicle. When the display 180 is a HUD, a projection module for projecting an image on the windshield of the vehicle 200 may be included.

Figure 4A:
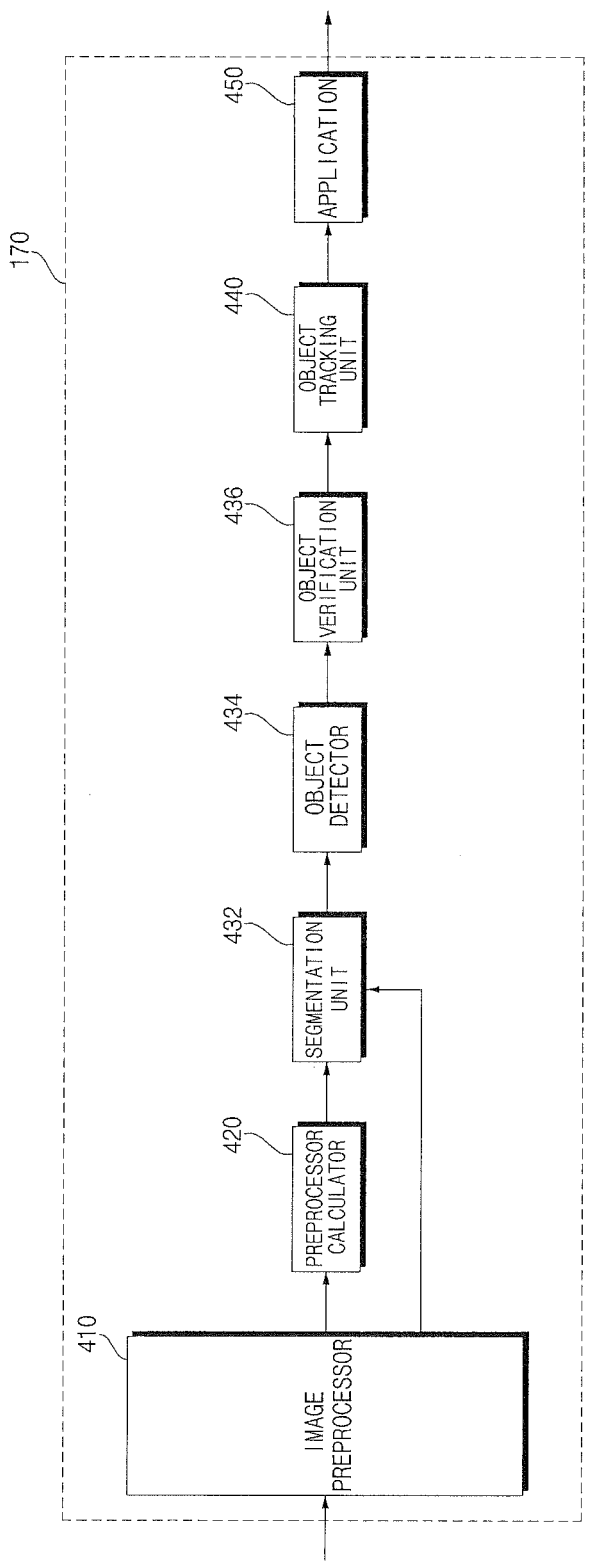
FIGS. 4A to 4B are block diagrams showing various examples of the internal configuration of the processors of FIGS. 3A to 3B.
Figure 4B:
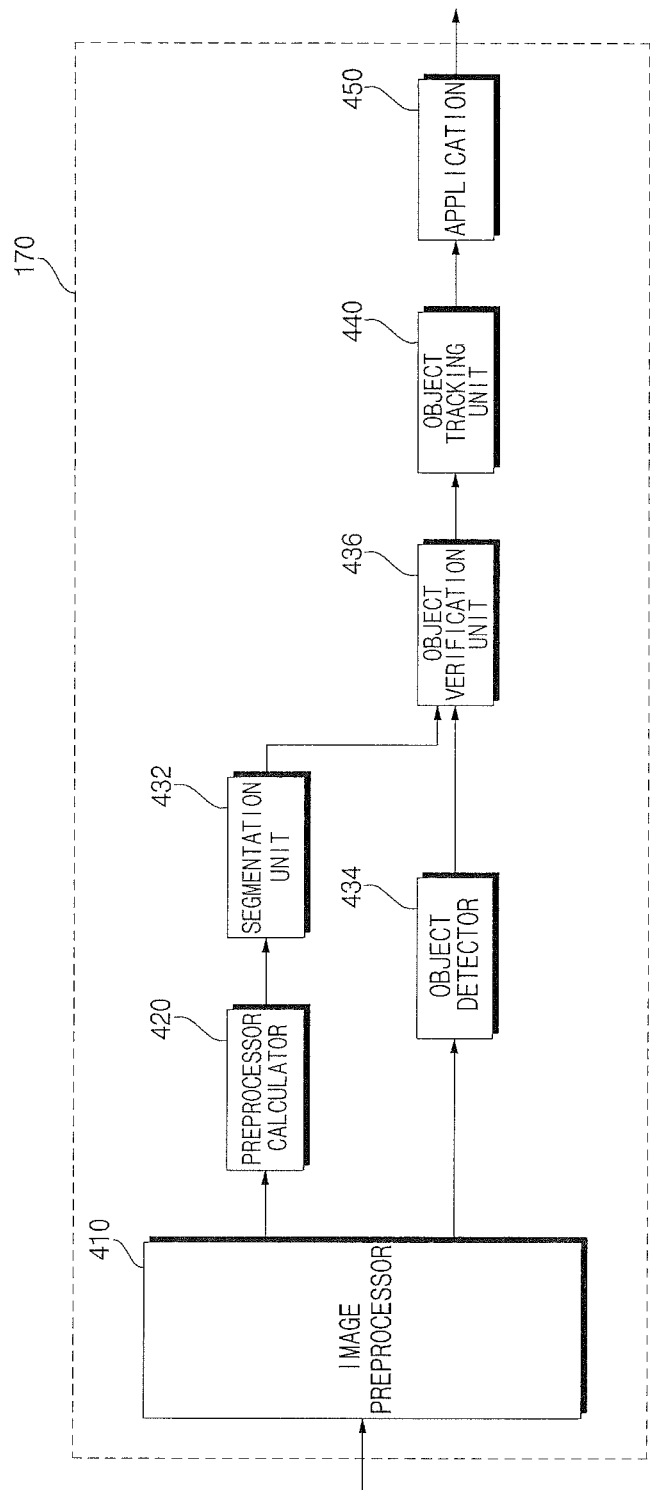

FIGS. 4A to 4B are block diagrams showing various examples of the internal configuration of the processors of FIGS. 3A to 3B, and FIGS. 5A to 5B are diagrams referenced to explain operation of the processors of FIGS. 4A to 4B.

First, referring to FIG. 4A, FIG. 4A is a block diagram showing an example of the internal configuration of the processor 170. The processor 170 of the vehicle driving assistance device 100 may include an image pre-processor 410, a disparity calculator 420, an object detector 434, an object tracking unit 440 and an application 450.

The image preprocessor 410 receives the stereo images from the stereo camera 195 and performs preprocessing.

More specifically, the image preprocessor 410 may perform noise reduction, rectification, calibration, color enhancement, color space conversion (CSC), interpolation, camera gain control, etc. with respect to the stereo image. Therefore, it is possible to acquire stereo images having higher definition than that of the stereo images captured by the stereo camera 195.

The disparity calculator 420 receives the stereo images processed by the image preprocessor 410, performs stereo matching with respect to the received stereo images, and acquires a disparity map according to stereo matching. That is, it is possible to acquire disparity information of the stereo images of the front side of the vehicle.

At this time, stereo matching may be performed in pixel units of the stereo images or predetermined block units. The disparity map may mean a map numerically expressing the binocular parallax information of the stereo images, that is, left and right images.

A segmentation unit 432 may perform segmentation and clustering with respect to at least one of the stereo images based on the disparity information from the disparity calculator 420.

More specifically, the segmentation unit 432 may segment a background and a foreground with respect to at least one of the stereo images based on the disparity information.

For example, a region having disparity information of a predetermined value or less in the disparity map may be calculated as the background and be excluded. Therefore, the foreground may be segmented.

As another example, a region having disparity information of a predetermined value or more in the disparity map may be calculated as the foreground and be extracted. Therefore, the background may be segmented.

The foreground and the background may be segmented based on the disparity information extracted based on the stereo images, thereby reducing a signal processing speed, the amount of processed signals, etc. upon subsequent object detection.

Next, the object detector 434 may detect an object based on image segmentation of the segmentation unit 432.

That is, the object detector 434 may detect an object from at least one of the stereo images based on the disparity information.

More specifically, the object detector 434 may detect the object from at least one of the stereo images. For example, the object may be detected from the foreground segmented by segmentation.

Next, an object verification unit 436 classifies and verifies the segmented objects.

To this end, the object verification unit 436 may use an identification method using a neural network, a support vector machine (SVM) method, an AdaBoost identification method using Haar-like features or a histograms-of-oriented-gradients (HOG) method, etc.

The object verification unit 436 may compare the detected object with the objects stored in the memory 140 to verify the object.

For example, the object verification unit 436 may verify a peripheral vehicle, a lane, a road surface, a traffic sign, a dangerous zone, a tunnel, etc. located in the vicinity of the vehicle.

The object tracking unit 440 tracks the verified object. For example, objects in the sequentially acquired stereo images may be verified, motion or motion vectors of the verified objects may be calculated and movement of the objects may be tracked based on the calculated motion or motion vectors. Therefore, it is possible to track the peripheral vehicle, the lane, the road surface, the traffic sign, the dangerous zone, the tunnel, etc. located in the vicinity of the vehicle.

Next, the application 450 may calculate a degree of danger of the vehicle 200 based on the various objects located in the vicinity of the vehicle, e.g., another vehicle, a lane, a road surface, a traffic sign, etc. In addition, collision with a preceding vehicle or vehicle slipping may be calculated.

The application 450 may output a message indicating such information to a user as vehicle driving assistance information based on the calculated degree of danger, collision with another vehicle or vehicle slipping. Alternatively, a control signal for attitude control or driving control of the vehicle 200 may be generated as vehicle control information.

FIG. 4B is a block diagram showing another example of the internal configuration of the processor.

Referring to the figure, the processor 170 of FIG. 4B is equal to the processor 170 of FIG. 4A except for a signal processing order. Hereinafter, only the difference will be described.

The object detector 434 may receive the stereo images and detect the object from at least one of the stereo images. Unlike FIG. 4A, the object may not be detected from the segmented image but may be directly detected from the stereo images based on the disparity information.

Next, the object verification unit 436 classifies and verifies the image segment from the segmentation unit 432 and the object detected by the object detector 434.

To this end, the object verification unit 436 may use an identification method using a neural network, a support vector machine (SVM) method, an AdaBoost identification method using Haar-like features or a histograms-of-oriented-gradients (HOG) method, etc.

Figure 5A:
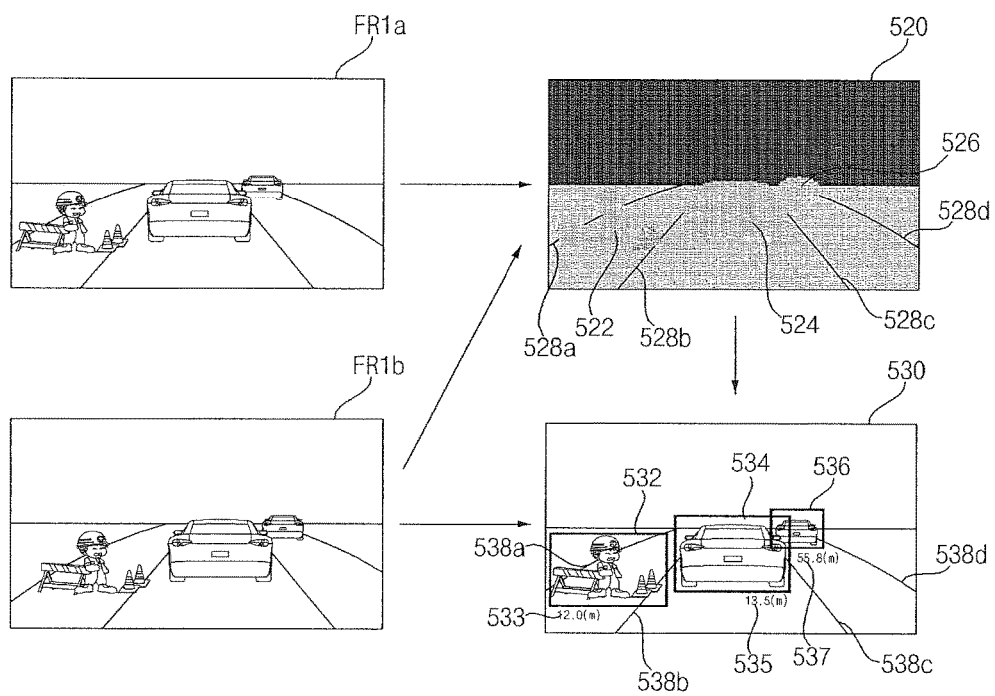
FIGS. 5A to 5B are diagrams referenced to explain operation of the processors of FIGS. 4A to 4B.
Figure 5B:
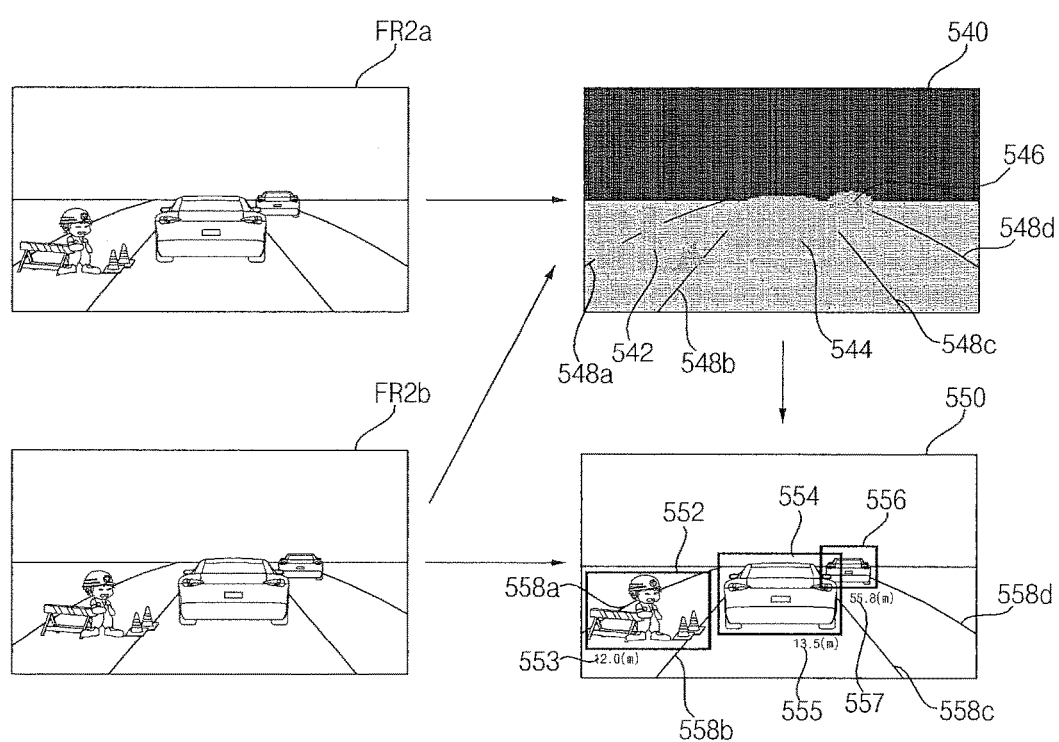

FIGS. 5A and 5B are views referenced to explain operation of the processor 170 of FIG. 4A based on the stereo images acquired during first and second frame periods.

First, referring to FIG. 5A, the stereo camera 195 acquires the stereo images during the first frame period.

The disparity calculator 420 of the processor 170 receives the stereo images FR1a and FR1b processed by the image preprocessor 410, performs stereo matching with respect to the received stereo images FR1a and FR1b, and acquires a disparity map 520.

The disparity map 520 expresses the binocular parallax level between the stereo images FR1a and FR1b. As a disparity level increases, a distance from a vehicle decreases and, as the disparity level decreases, the distance from the vehicle increases.

When such a disparity map is displayed, as the disparity level increases, luminance increases and, as the disparity level decreases, luminance decreases.

In the figure, the disparity map 520 has disparity levels respectively corresponding to first to fourth lanes 528a, 528b, 528c and 528d, for example, disparity levels respectively corresponding to a construction area 522, a first preceding vehicle 524 and a second preceding vehicle 526.

The segmentation unit 432, the object detector 434 and the object verification unit 436 may perform segmentation, object detection and object verification with respect to at least one of the stereo images FR1a and FR1b based on the disparity map 520.

In the figure, object detection and verification are performed with respect to the second stereo image FR1b using the disparity map 520.

That is, the first to fourth lanes 538a, 538b, 538c and 538d, the construction area 532, the first preceding vehicle 534 and the second preceding vehicle 536 are detected and verified from the image 530 as objects.

Next, referring to FIG. 5B, the stereo camera 195 acquires the stereo images during the second frame period.

The disparity calculator 420 of the processor 170 receives the stereo images FR2a and FR2b processed by the image preprocessor 410, performs stereo matching with respect to the received stereo images FR2a and FR2b, and acquires a disparity map 540.

In the figure, the disparity map 540 has disparity levels respectively corresponding to first to fourth lanes 548a, 548b, 548c and 548d, for example, disparity levels respectively corresponding to a construction area 542, a first preceding vehicle 544 and a second preceding vehicle 546.

The segmentation unit 432, the object detector 434 and the object verification unit 436 may perform segmentation, object detection and object verification with respect to at least one of the stereo images FR2a and FR2b based on the disparity map 540.

In the figure, object detection and verification are performed with respect to the second stereo image FR2b using the disparity map 540.

That is, the first to fourth lanes 558a, 558b, 558c and 558d, the construction area 552, the first preceding vehicle 554 and the second preceding vehicle 556 are detected and verified from the image 550 as objects.

The object tracking unit 440 may track the verified objects by comparing FIG. 5A and FIG. 5B.

More specifically, the object tracking unit 440 may track movement of the objects based on the motion or motion vectors of the objects verified as shown in FIGS. 5A and 5B. Therefore, it is possible to track the lane, the construction area, the first preceding vehicle and the second preceding vehicle located in the vicinity of the vehicle.

Figure 6A:
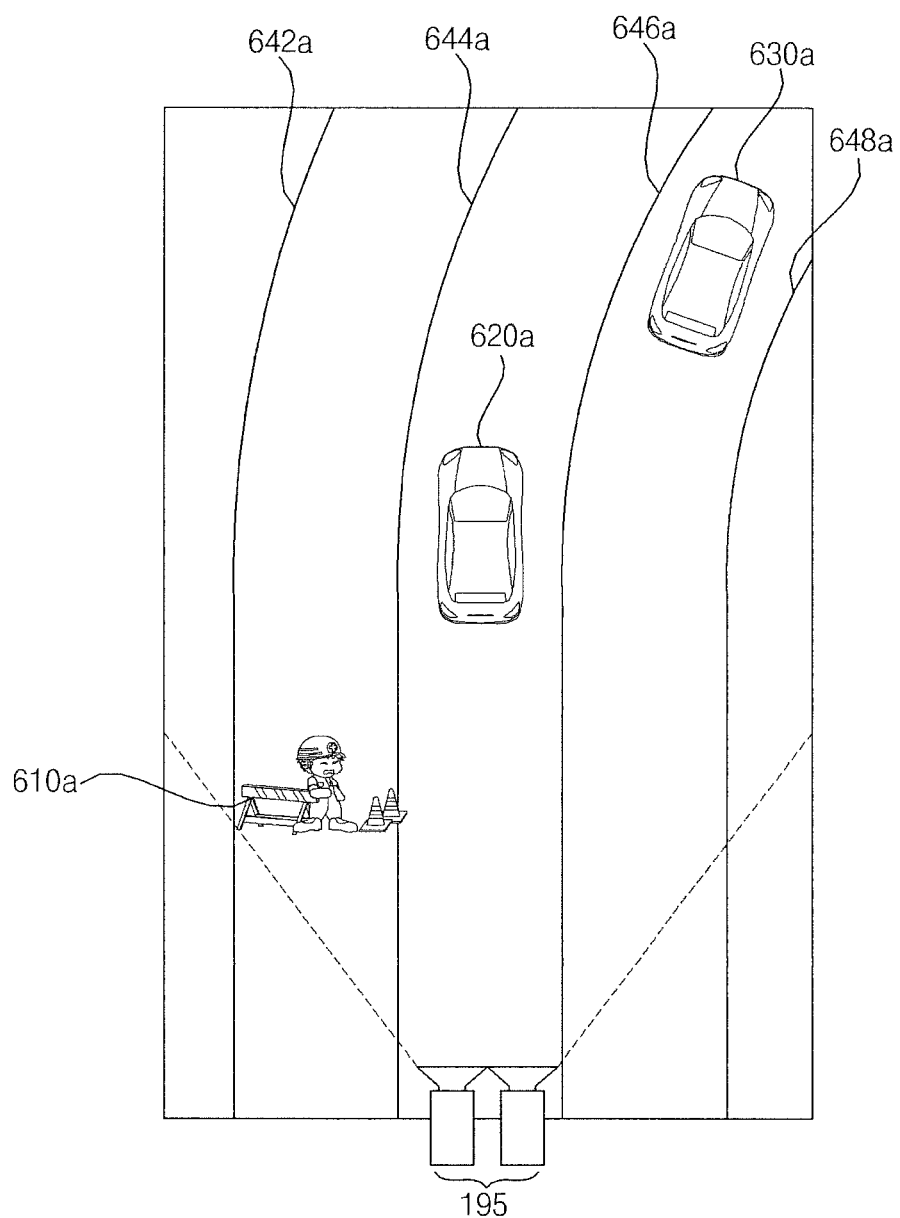
FIGS. 6A to 6B are views referenced to explain operation of the vehicle driving assistance device of FIGS. 3A to 3B.
Figure 6B:
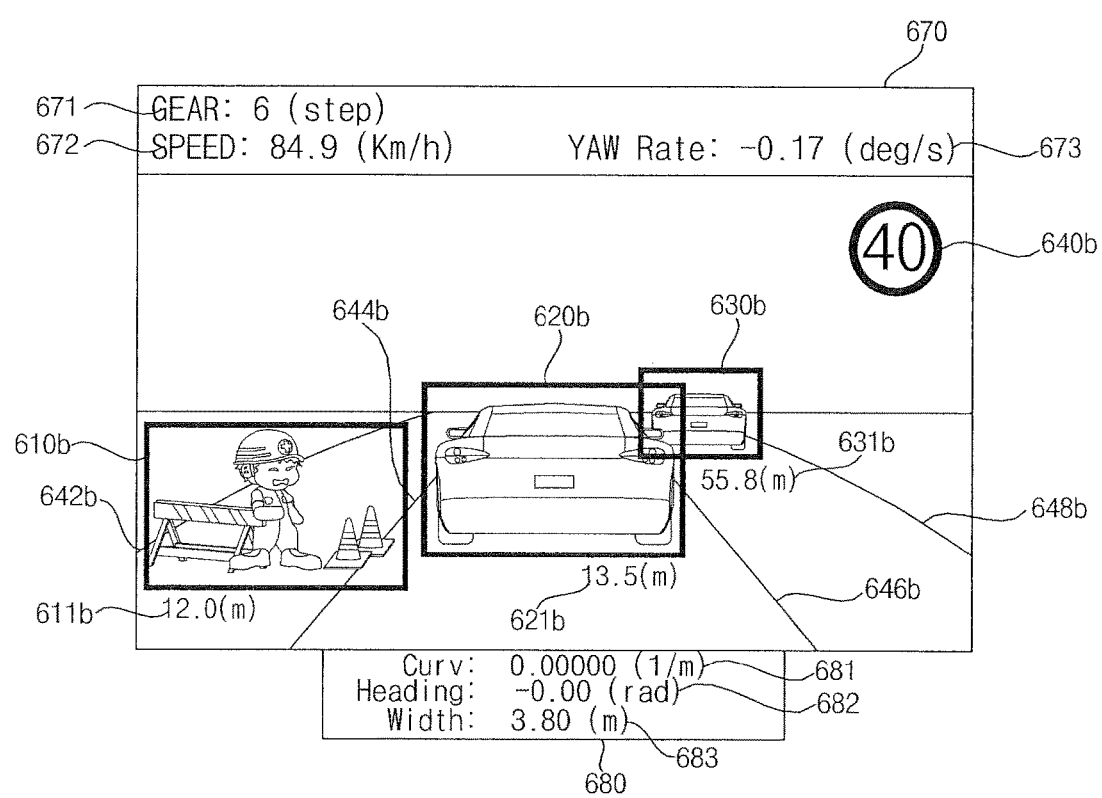

FIGS. 6A to 6B are views referenced to explain operation of the vehicle driving assistance device of FIGS. 3A to 3B.

First, FIG. 6A shows the road conditions at the front side of the vehicle captured by the stereo camera 195 provided in the vehicle. In particular, the road conditions at the front side of the vehicle are shown in a bird's eye view.

Referring to the figure, a first lane 642a, a second lane 644a, a third lane 646a and a fourth lane 648a are sequentially located from the left to the right, a construction area 610a is located between the first lane 642a and the second lane 644a, a first preceding vehicle 620a is located between the second lane 644a and the third lane 646a, and a second preceding vehicle 630a is located between the third lane 646a and the fourth lane 648a.

Next, FIG. 6B shows the condition of the front side of the vehicle grasped by the vehicle driving assistance device along with a variety of information. In particular, the image shown in FIG. 6B may be displayed on the display 180 or the AVN apparatus 400 provided in the vehicle driving assistance device.

In FIG. 6B, information is displayed based on the image captured by the stereo camera 195, unlike FIG. 6A.

Referring to the figure, a first lane 642b, a second lane 644b, a third lane 646b and a fourth lane 648b are sequentially located from the left to the right, a construction area 610b is located between the first lane 642b and the second lane 644b, a first preceding vehicle 620b is located between the second lane 644b and the third lane 646b, and a second preceding vehicle 630b is located between the third lane 646b and the fourth lane 648b.

The vehicle driving assistance device 100 may perform signal processing based on the stereo images captured by the stereo camera 195 and verify the objects of the construction area 610b, the first preceding vehicle 620b and the second preceding vehicle 630b. In addition, the first lane 642b, the second lane 644b, the third lane 646b and the fourth lane 648b may be verified.

The edges of the construction area 610b, the first preceding vehicle 620b and the second preceding vehicle 630b are highlighted in order to show object verification.

The vehicle driving assistance device 100 may calculate information on distances from the construction area 610b, the first preceding vehicle 620b and the second preceding vehicle 630b based on the stereo images captured by the stereo camera 195.

In the figure, first distance information 611b, second distance information 621b and third distance information 631b respectively corresponding to the construction area 610b, the first preceding vehicle 620b and the second preceding vehicle 630b are shown.

The vehicle driving assistance device 100 may receive the sensor information of the vehicle from the ECU 770 or the sensor unit 760. In particular, vehicle speed information, gear information, yaw rate information indicating the rate of the rotation angle (yaw angle) of the vehicle and vehicle angle information may be received and displayed.

Although the vehicle speed information 672, the gear information 671 and the yaw rate information 673 are displayed at the upper side 670 of the front image of the vehicle and the vehicle angle information 682 is displayed at the lower side 680 of the front image of the vehicle in the figure, the present invention is not limited thereto. Vehicle width information 683 and road curvature information 681 may be displayed along with the vehicle angle information 682.

The vehicle driving assistance device 100 may receive speed limit information of a road, on which the vehicle travels, through the communication unit 120 or the interface 130. In the figure, the speed limit information 640b is displayed.

The vehicle driving assistance device 100 may display a variety of information shown in FIG. 6B on the display 180 or store a variety of information without displaying the information. Such information may be used for various applications.

Figure 7:
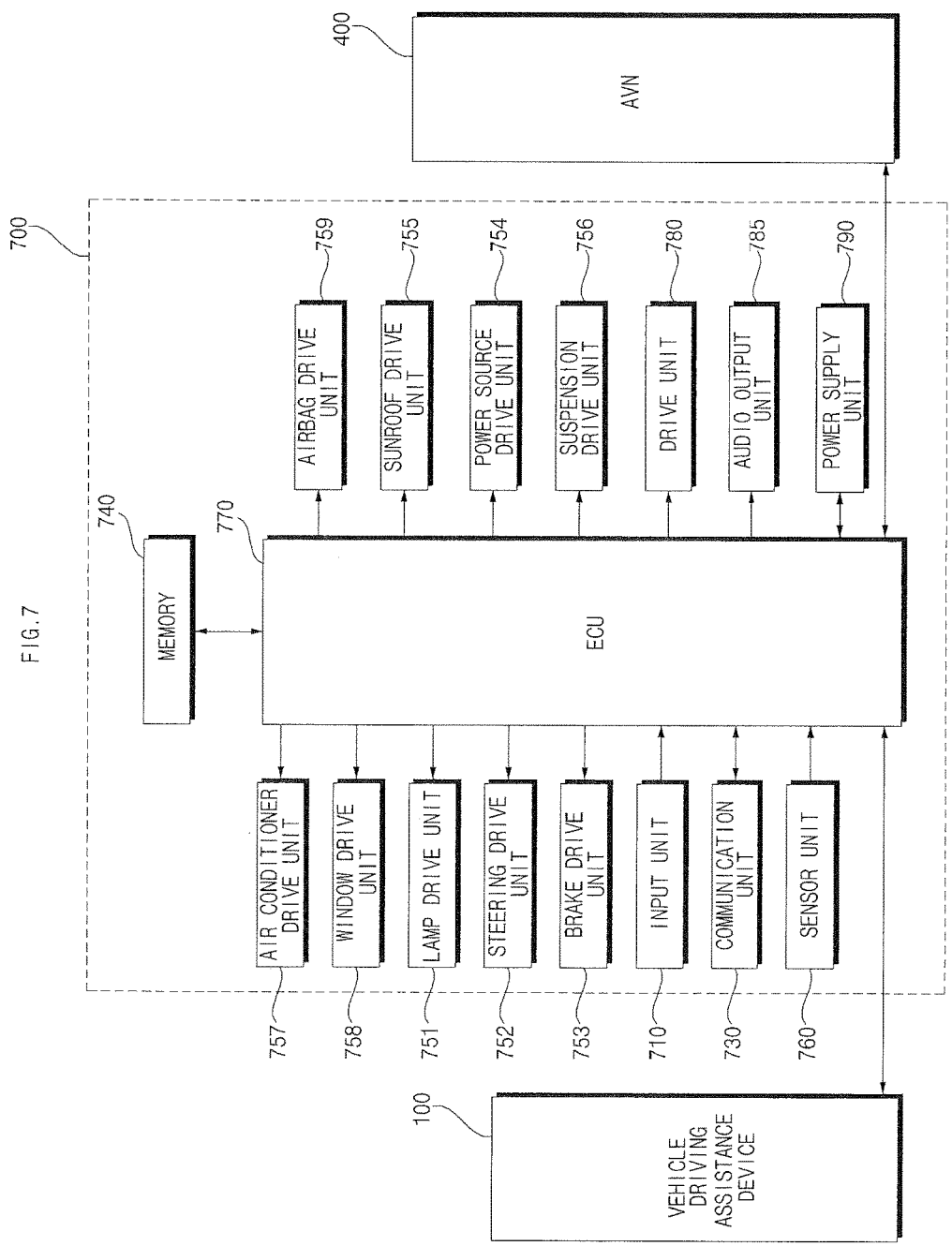
FIG. 7 is a block diagram showing an example of an electronic control apparatus in the vehicle of FIG. 1.

FIG. 7 is a block diagram showing an example of an electronic control apparatus in the vehicle of FIG. 1.

Referring to the figure, the vehicle 200 may include an electronic control apparatus 700 for vehicle control. The electronic control apparatus 700 may exchange data with the vehicle driving assistance device 100 and the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit, a suspension drive unit 756, an air conditioner drive unit 757, a window drive unit 758, an airbag drive unit 759, a sensor unit 760, an ECU 770, a display unit 780, an audio output unit 785 and a power supply unit 790.

The input unit 710 may include a plurality of buttons or a touchscreen provided inside the vehicle 200. Through the plurality of buttons or the touchscreen, a variety of input operations may be performed.

The communication unit 720 may exchange data with the mobile terminal 600 or the server 500 in a wireless manner. In particular, the communication unit 720 may exchange data with a mobile terminal of a vehicle driver in a wireless manner. A wireless data communication method includes various data communication methods such as Bluetooth, Wi-Fi Direct, Wi-Fi, APiX, etc.

For example, the communication unit 720 may receive weather information and road traffic state information, e.g., Transport Protocol Experts Group (TPEG) information, from the mobile terminal 600 or the server 500.

When a user gets into the vehicle, the mobile terminal 600 of the user and the electronic control apparatus 700 may pair with each other automatically or as the user executes an application.

The memory 740 may store a variety of data for overall operation of the electronic control apparatus 700, such as a program for processing or control of the ECU 770.

The lamp drive unit 751 may turn lamps arranged inside and outside the vehicle on or off. In addition, the lamp drive unit may control, for example, the intensity and direction of light of each lamp. For example, the lamp drive unit may perform control of a turn signal lamp or a brake lamp.

The steering drive unit 752 may perform electronic control of a steering apparatus inside the vehicle 200. The steering drive unit may change the direction of travel of the vehicle.

The brake drive unit 753 may perform electronic control of a brake apparatus (not illustrated) inside the vehicle 200. For example, the brake drive unit may reduce the speed of the vehicle 200 by controlling the operation of brakes located at wheels. In another example, the brake drive unit may adjust the direction of travel of the vehicle 200 leftward or rightward by differentiating the operation of respective brakes located at left and right wheels.

The power source drive unit 754 may perform electronic control of a power source inside the vehicle 200.

For example, in the case where a fossil fuel based engine (not illustrated) is a power source, the power source drive unit 754 may perform electronic control of the engine. Therefore, it is possible to control output torque of the engine.

In another example, in the case where an electric motor (not illustrated) is a power source, the power source drive unit 754 may perform control of the motor. As such, the power source drive unit may control, for example, the RPM and torque of the motor.

The sunroof drive unit 755 may perform electronic control of a sunroof apparatus (not illustrated) inside the vehicle 200. For example, the sunroof drive unit may control opening or closing of a sunroof.

The suspension drive unit 756 may perform electronic control of a suspension apparatus inside the vehicle 200. For example, when a road surface is uneven, the suspension drive unit may control the suspension apparatus to reduce vibration of the vehicle 200.

The air conditioner drive unit 757 may perform electronic control of an air conditioner (not illustrated) inside the vehicle 200. For example, when the interior temperature of the vehicle 200 is high, the air conditioner drive unit may operate the air conditioner to supply cold air to the interior of the vehicle 200.

The window drive unit 758 may perform electronic control of a window apparatus inside the vehicle 200. For example, the window drive unit may control opening or closing of left and right windows of the vehicle 200.

The airbag drive unit 759 may perform the electronic control of an airbag apparatus inside the vehicle 200. For example, the airbag drive unit may control an airbag to be deployed in a dangerous situation.

The sensing unit 760 is configured to sense signals associated with traveling of the vehicle 200. To this end, the sensing unit 760 may include a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, etc.

As such, the sensing unit 760 may acquire sensing signals with regard to, for example, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The ECU 770 may control overall operation of the units of the electronic control apparatus 700.

The ECU may perform specific operation based on input received through the input unit 710 or receive and transmit the signal sensed by the sensor unit 760 to the vehicle driving assistance device 100, receive map information from the AVN apparatus 400 and control operations of the drive units 751, 752, 753, 754 and 756.

In addition, the ECU 770 may receive weather information and road traffic state information, e.g., Transport Protocol Experts Group (TPEG) information, from the communication unit 720.

The display unit 780 may display an image related to operation of the vehicle driving assistance device. For image display, the display unit 780 may include a cluster or a head up display (HUD) located at the internal front side of the vehicle. When the display unit 780 is a HUD, a projection module for projecting an image onto the windshield of the vehicle 200 may be included. The display unit 780 may include a touchscreen capable of performing an input function.

The audio output unit 785 converts an electrical signal from the ECU 770 into an audio signal and outputs the audio signal. The audio output unit may include a speaker. The audio output unit 785 may output sound corresponding to operation of the input unit 110, that is, a button.

The power supply unit 790 may supply power required to operate the respective components under the control of the ECU 770. In particular, the power supply unit 790 may receive power from, for example, a battery (not illustrated) inside the vehicle.

Figure 8A:
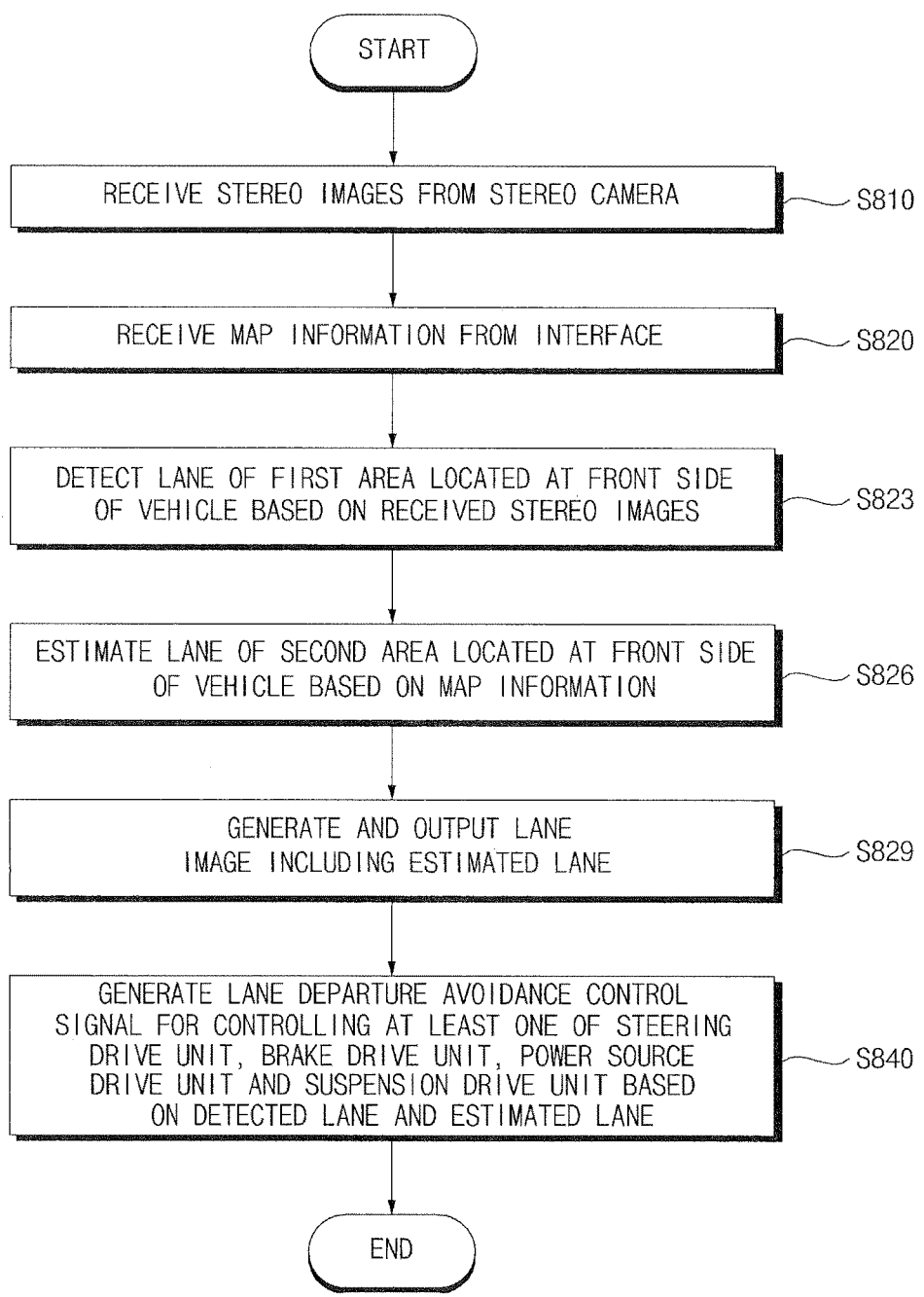
FIG. 8A is a flowchart illustrating a method of operating a vehicle driving assistance device according to an embodiment of the present invention.

FIG. 8A is a flowchart illustrating a method of operating a vehicle driving assistance device according to an embodiment of the present invention.

Referring to the figure, the processor 170 of the vehicle driving assistance device 100 receives stereo images from the stereo camera (S810). The processor 170 of the vehicle driving assistance device 100 receives map information from the interface (S820). Then, the processor 170 of the vehicle driving assistance device 100 detects a lane of a first area located at the front side of the vehicle based on the received stereo images (S823).

As described with reference to FIG. 2, the processor 170 of the vehicle driving assistance device 100 receives images through a stereo camera 195 provided inside the vehicle, that is, receives a first image through a first camera 195a and receives a second image through a second camera 195b.

Since the first camera 195a and the second camera 195b are separated, disparity between the first image and the second image is generated.

The processor 170 of the vehicle driving assistance device 100 calculates disparity between the first image and the second image and performs segmentation, object detection and object verification with respect to at least one of the first image and the second image using the calculated disparity information.

The processor 170 of the vehicle driving assistance device 100 tracks the confirmed objects, e.g., a preceding vehicle, a lane, a road surface, etc. The processor 170 of the vehicle driving assistance device 100 may acquire distance information of the preceding vehicle located at the front side of the vehicle.

The processor 170 of the vehicle driving assistance device 100 may detect a lane based on the stereo images of a first area excluding an area, in which a lane may not be detected, when only an area close to the vehicle can be identified due to environmental conditions such as fog or night.

The following lane estimation scheme is used for the area in which the lane may not be detected based on the stereo images.

Next, the processor 170 of the vehicle driving assistance device 100 estimates a lane of a second area located at the front side of the vehicle based on the map information (S826).

The processor 170 of the vehicle driving assistance device 100 may estimate the lane of the second area located at the front side of the vehicle, in which the lane may not be detected due to environmental conditions such as fog or night, based on the map information received from the interface 130.

To this end, the processor 170 of the vehicle driving assistance device 100 may compare lane information detected based on the stereo images and the map information received from the interface 130 and identify the second area other than the first area. The lane information of the second area may be acquired from the map information. Based on the acquired lane information, the lane of the second area may be estimated.

Next, the processor 170 of the vehicle driving assistance device 100 generates and outputs a lane image including the estimated lane (S829).

The processor 170 of the vehicle driving assistance device 100 may estimate the lane of the second area and then output a first lane image $S_{lim}$ corresponding to lane estimation. The processor 170 of the vehicle driving assistance device 100 may also output a second lane image corresponding to lane detection. Such lane images may be displayed on the display 180 provided inside the vehicle 200.

Next, the processor 170 of the vehicle driving assistance device 100 generates a lane departure avoidance control signal for controlling at least one of the steering drive unit 752, the brake drive unit 753, the power source drive unit 754 and the suspension drive unit 756 based on the detected lane and the estimated lane (S840).

The processor 170 of the vehicle driving assistance device 100 may compare information on the current direction of travel of the vehicle and the estimated lane after estimating the lane of the second area, calculate lane departure and generate a lane departure avoidance control signal Sned for lane departure avoidance upon lane departure.

For example, the processor 170 of the vehicle driving assistance device 100 may generate at least one of a steering drive control signal or a brake drive control signal for moving the vehicle to the right when the vehicle departs from the lane toward a left lane.

The ECU 770 may receive at least one of the steering drive control signal or the brake drive control signal through the interface 130 and the steering drive unit 752 may control the steering apparatus to steer to the right or the brake drive unit 753 may operate a left brake.

Accordingly, it is possible to control lane departure avoidance of the vehicle through the vehicle driving assistance device 100 based on the stereo images.

As another example, the processor 170 of the vehicle driving assistance device 100 may generate at least one of a steering drive control signal or a brake drive control signal for moving the vehicle to the right, when it is determined that the vehicle departs from the lane toward the left lane due to a curved road in a right direction although the vehicle actually goes straight.

Figure 8B:
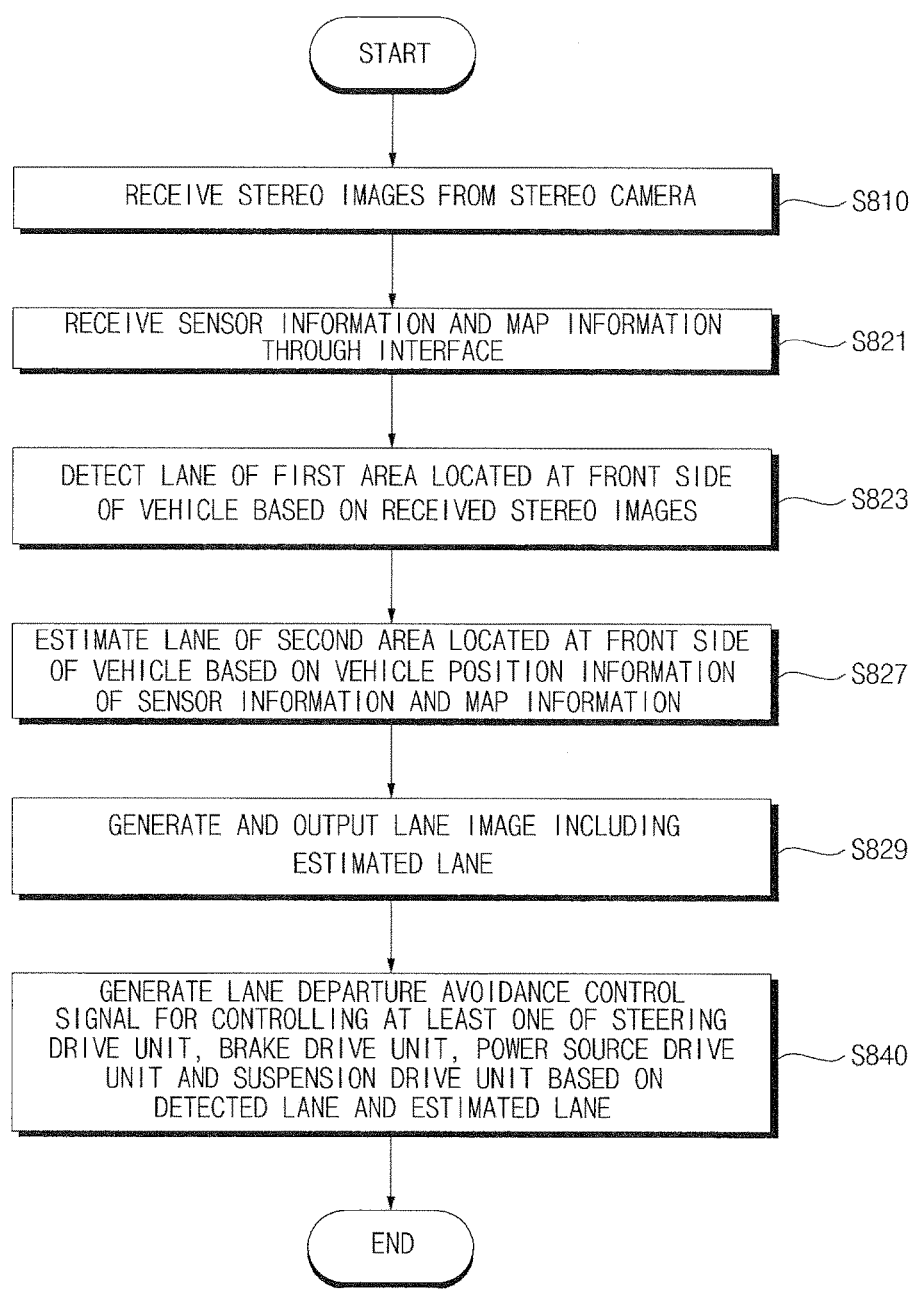
FIG. 8B is a flowchart illustrating a method of operating a vehicle driving assistance device according to another embodiment of the present invention.

FIG. 8B is a flowchart illustrating a method of operating a vehicle driving assistance device according to another embodiment of the present invention.

The method of FIG. 8B is similar to FIG. 8A, but is different therefrom in that step S821 similar to step S820 and step S827 similar to step S826 are performed.

Hereinafter, only steps S821 and S826 will be described.

In step S821, the processor 170 of the vehicle driving assistance device 100 receives sensor information and map information through the interface (S821).

The sensor information received through the interface may include vehicle driving information Scar. Here, the vehicle driving information Scar may include vehicle direction information, vehicle position information, vehicle angle information, vehicle speed information, vehicle tilt information, etc. related to vehicle driving.

In step S827, the processor 170 of the vehicle driving assistance device 100 estimates the lane of the second area located at the front side of the vehicle based on the vehicle location information and the map information (S827).

The processor 170 of the vehicle driving assistance device 100 may receive the vehicle driving information Scar from the ECU 770 or the sensor unit 760 and map the current location of the vehicle on the map based on the vehicle position information of the vehicle driving information Scar received from the ECU 770 or the sensor unit 760 and the map information Smap received from the interface 130.

The processor 170 of the vehicle driving assistance device 100 may acquire lane information of the second area from the map information in consideration of the lane information detected based on the stereo images. Based on the acquired lane information, the lane of the second area may be estimated.

Figure 9:
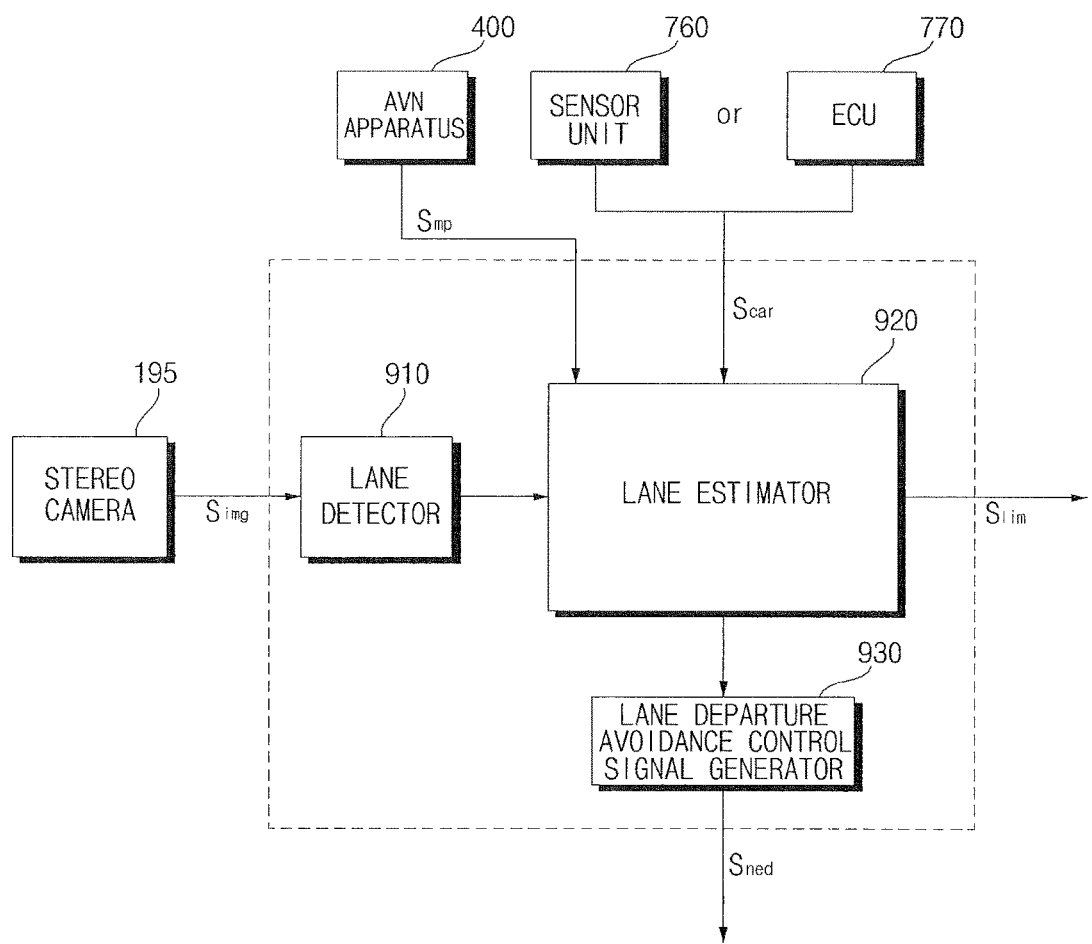
FIGS. 9 to 16B are views referenced to explain the operating method of FIG. 8A or 8B.

FIG. 9 is a block diagram showing an example of the internal configuration of a processor for lane estimation.

Referring to the figure, the processor 170 of the vehicle driving assistance device 100 may include a lane detector 910, a lane estimator 920, and a lane departure avoidance control signal generator 930.

The processor 170 of the vehicle driving assistance device 100 may receive stereo images $S_{img}$ from the stereo camera 195, receive map information Smp from the AVN apparatus 400 through the interface 130, and receive the vehicle driving information Scar from the ECU 770 or the sensor unit 760.

Here, the vehicle driving information may include vehicle direction-of-travel information, vehicle position information (GPS information), vehicle angle information, vehicle speed information, vehicle tilt information, lateral entry information, vehicle reverse information, etc. The vehicle driving information may be part of the sensor information.

The lane detector 910 may perform lane detection based on the stereo images $S_{img}$ received from the front stereo camera 195. More specifically, a front lane may be detected based on disparity of the stereo images $S_{img}$.

In particular, the lane detector 910 may detect a lane of the first area which may be confirmed through the front stereo camera 195.

In particular, when only an area close to the vehicle may be identified due to environmental conditions such as fog or night, only the lane of the first area may be detected based on the stereo images.

In the area in which the lane may not be detected based on the stereo images, the following lane estimation scheme is used.

The lane estimator 920 may estimate the lane of the second area located at the front side of the vehicle based on the map information Smp received from the interface 130.

In particular, the lane estimator 920 may estimate the lane of the second area located at the front side of the vehicle, in which the lane may not be detected due to environmental conditions such as fog or night.

To this end, the lane estimator 920 may compare the lane information detected based on the stereo images and the map information Smp received from the interface 130 and identify the second area other than the first area. The lane information of the second area may be acquired from the map information. Based on the acquired lane information, the lane of the second area may be estimated.

The lane estimator 920 may receive the vehicle driving information Scar from the ECU 770 or the sensor unit 760 and map the current location of the vehicle on the map based on the map information Smp received from the interface 130 or the vehicle position information of the vehicle driving information Scar received from the ECU 770 or the sensor unit 760.

The lane estimator 920 may acquire the lane information of the second area from the map information in consideration of the lane information detected based on the stereo images. Based on the acquired lane information, the lane of the second area may be estimated.

After estimating the lane of the second area, the lane estimator 920 may output a first lane image $S_{lim}$ corresponding to lane estimation. In addition, the lane estimator 920 may output a second lane image $S_{img}$ corresponding to the first area, that is, lane detection. Such lane images may be displayed on the display 180 provided inside the vehicle 200.

The lane departure avoidance control signal generator 930 may compare the current direction-of-travel information of the vehicle with the estimated lane after the lane estimator 920 estimates the lane of the second area, calculate lane departure and generate the lane departure avoidance control signal Sned for lane departure avoidance, upon lane departure.

The lane departure avoidance control signal Sned may be delivered to the ECU 770 and the ECU 770 may control at least one of the steering drive unit 752, the brake drive unit 753, the power source drive unit 754 and the suspension drive unit 756 based on the lane departure avoidance control signal Sned.

Figure 10:
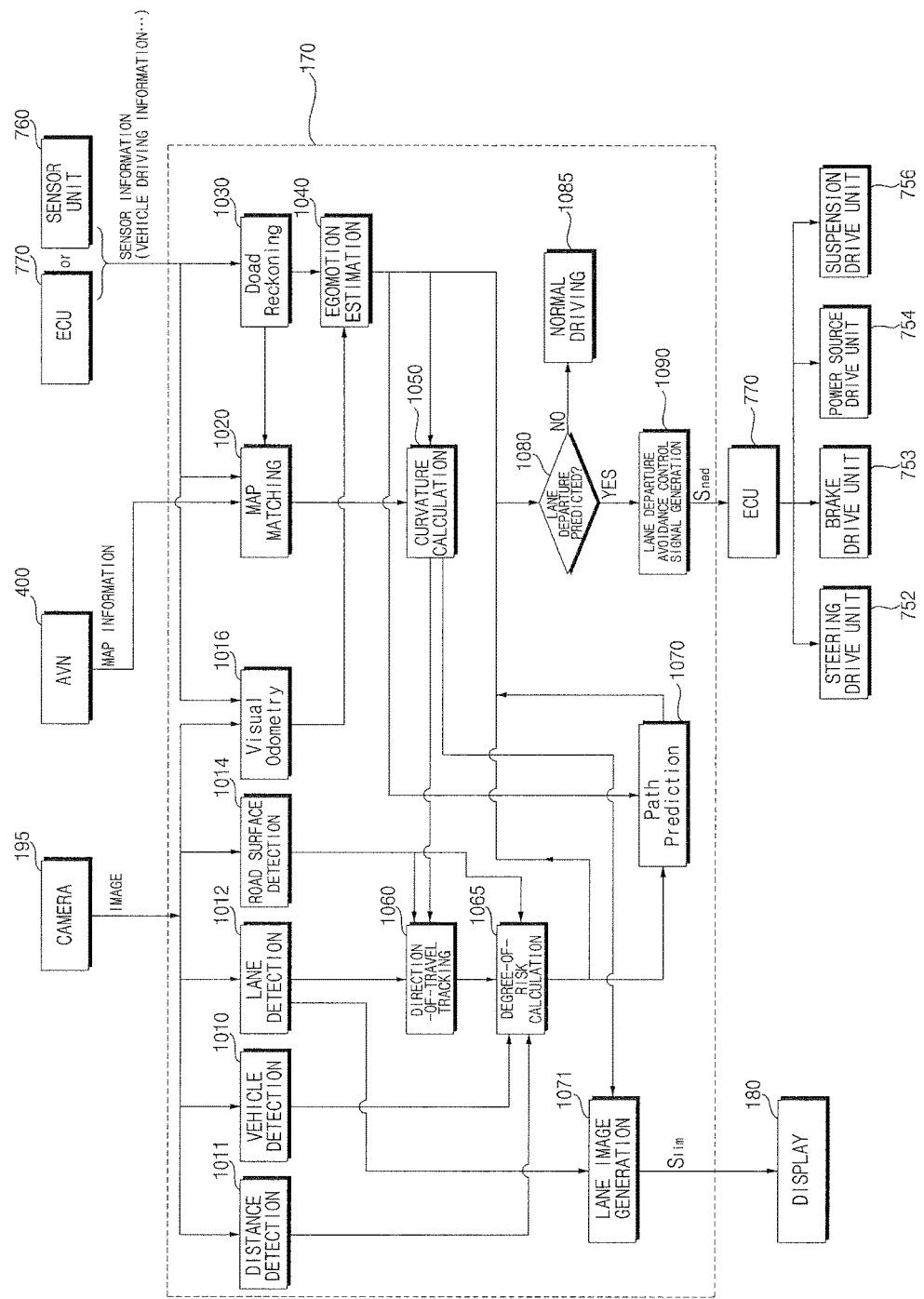

FIG. 10 is a block diagram showing another example of the internal configuration of the processor of FIG. 9.

Referring to the figure, the processor 170 of the vehicle driving assistance device 100 may detect image-based vehicle surrounding information based on the stereo images received from the front stereo camera 195. Here, the image-based vehicle surrounding information may include distance information, peripheral vehicle distance information, speed information, lane information, road surface information, traffic sign information, etc.

As described above, disparity information may be calculated based on the stereo images received from the front stereo camera 195 and segmentation, object detection and object verification may be performed based on the calculated disparity information.

The processor 170 of the vehicle driving assistance device 100 may perform vehicle detection 1010, distance detection 1011, lane detection 1012, road surface detection 1014 and visual odometry 1016, for the front side of the vehicle.

The processor 170 of the vehicle driving assistance device 100 may receive the map information from the AVN apparatus 400 and receive the sensor information from the ECU 770 or the sensor unit 760.

The processor 170 of the vehicle driving assistance device 100 performs map matching 1020 based on the vehicle driving information of the sensor information from the ECU 770 or the sensor unit 760 and the map information from the AVN apparatus 400. More specifically, the processor 170 of the vehicle driving assistance device 100 may map the current vehicle on the map (1020) based on the GPS information, which is the vehicle position information, of the vehicle driving information and the map information from the AVN apparatus 400.

The processor 170 of the vehicle driving assistance device 100 may perform vehicle dead reckoning 1030 based on the vehicle driving information from the ECU 770 or the sensor unit 760.

The processor 170 of the vehicle driving assistance device 100 performs vehicle egomotion tracking 1040 based on vehicle dead reckoning. At this time, in addition to vehicle dead reckoning, based on visual odometry, vehicle egomotion tracking 1040 may be performed.

The processor 170 of the vehicle driving assistance device 100 may perform calculation of the curvature of the driving road 1050 based on vehicle egomotion tracking 1040 and map matching 1020.

The processor 170 of the vehicle driving assistance device 100 performs vehicle direction-of-travel tracking 1060 based on curvature calculation 1050, lane detection 1012 and road surface detection 1014.

The processor 170 of the vehicle driving assistance device 100 may perform calculation of a degree-of-risk 1065 such as vehicle collision and rear-end collision based on vehicle direction-of-travel tracking 1060, vehicle detection 1010, distance detection 1011 and road surface detection 1014.

The processor 170 of the vehicle driving assistance device 100 performs vehicle path prediction 1070 based on degree-or-risk calculation 1065 and vehicle egomotion tracking 1040. That is, the processor 170 of the vehicle driving assistance device 100 predicts a vehicle path based on vehicle egomotion tracking 1040 and vehicle direction-of-travel tracking 1060.

Next, the processor 170 of the vehicle driving assistance device 100 performs lane departure prediction based on estimated vehicle egomotion and the predicted vehicle path (S1080) and performs generation of the lane departure avoidance control signal Sned 1090 when the vehicle departs from the lane. When the vehicle does not depart from the lane, normal driving 1085 is performed.

The generated lane departure avoidance control signal Sned is output to an external device and, more particularly, the ECU 770 of the vehicle, and the ECU 770 may control at least one of the steering drive unit 752, the brake drive unit 753, the power source drive unit 754 and the suspension drive unit 756, for lane departure avoidance.

Figure 11:
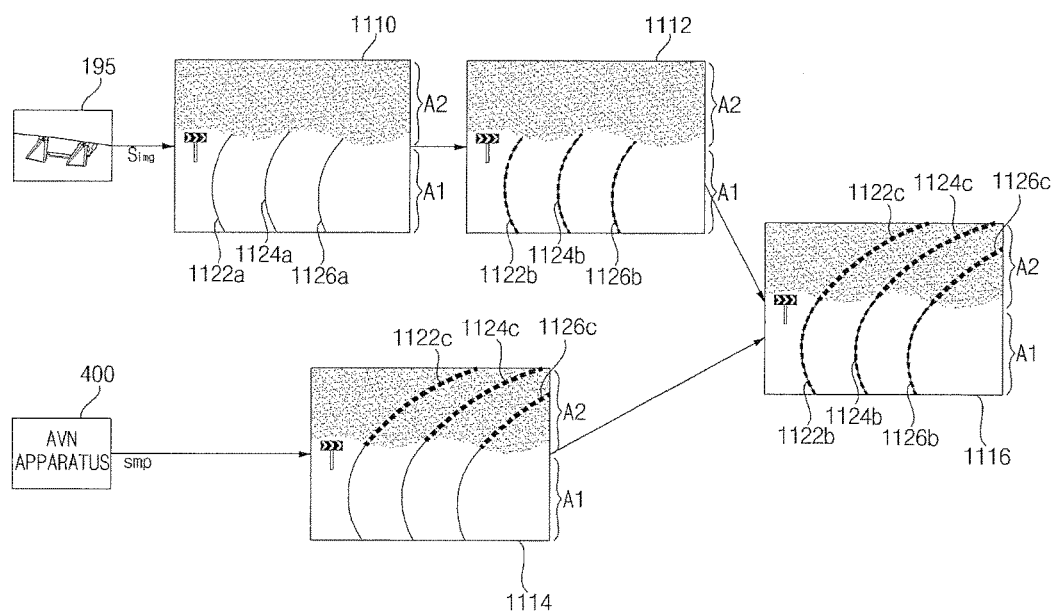

FIG. 11 is a diagram showing an example of a lane detection and lane estimation method of a first curved road.

Referring to the figure, the processor 170 of the vehicle driving assistance device 100 may acquire a stereo image 1110 of the front side of the vehicle through the stereo camera 195. The stereo image 1110 may include first to third curved lanes 1122a, 1124a and 1126a.

When the vehicle is driven on a foggy day or at night, only the lane near the vehicle is displayed through the stereo image 1110 of the front side of the vehicle and the lanes of the other area may not be identified.

The stereo image 1110 may be divided into a first area A1 in which lane detection based on an image is possible and a second area A2 in which lane detection is impossible.

The processor 170 of the vehicle driving assistance device 100 may perform lane detection and confirmation by the above-described object detection and confirmation scheme. The lane image of the detected lane may be generated.

The image 1112 of the figure shows the image of the detected lane after detecting the lane of the first area A1 based on the stereo image. Accordingly, the image 1112 shows that the generated first to third lane images 1122b, 1124b and 1126b overlap the actually captured first to third lanes 1122a, 1124a and 1126a.

The processor 170 of the vehicle driving assistance device 100 may receive the map information from the AVN apparatus 400 through the interface 130. In addition, the vehicle position information of the sensor information may be received.

The processor 170 of the vehicle driving assistance device 100 performs lane estimation with respect to the second area A2 of the stereo image based on the received map information or the map information and the vehicle position information.

The processor 170 of the vehicle driving assistance device 100 may compare the lane information detected based on the stereo image and the map information Smp received from the interface 130 and identify the second area other than the first area. The lane information of the second area may be acquired from the map information. Based on the acquired lane information, the lane of the second area may be estimated. The lane image of the estimated lane may be generated.

The image 1114 of the figure shows the image of the estimated lane after estimating the lane of the second area A2 based on the map information Smp received from the interface 130. Accordingly, the image 1114 shows that the generated first to third lane images 1122c, 1124c and 1126c are overlapped in the second area A2.

The processor 170 of the vehicle driving assistance device 100 may output the image 1114, for display on the display 180. Thus, a user can intuitively confirm the lane of the second area.

The processor 170 of the vehicle driving assistance device 100 may combine the image 1112 and the image 1114 to generate an image 1116. The image 1116 shows that the first to third lane images 1122b, 1124b and 1126b based on the detected lane are overlapped in the first area A1 and the first to third lane images 1122c, 1124c and 1126c based on the estimated lane are overlapped.

In the figure, the first to third lane images 1122c, 1124c and 1126c have a curve in the same direction as the first curve of the detected lane. That is, the first curved road is a C-shaped curved road.

The processor 170 of the vehicle driving assistance device 100 may output the image 1116, for display on the display 180. Thus, a user can intuitively confirm the lanes of the first area and the second area.

Figure 12:
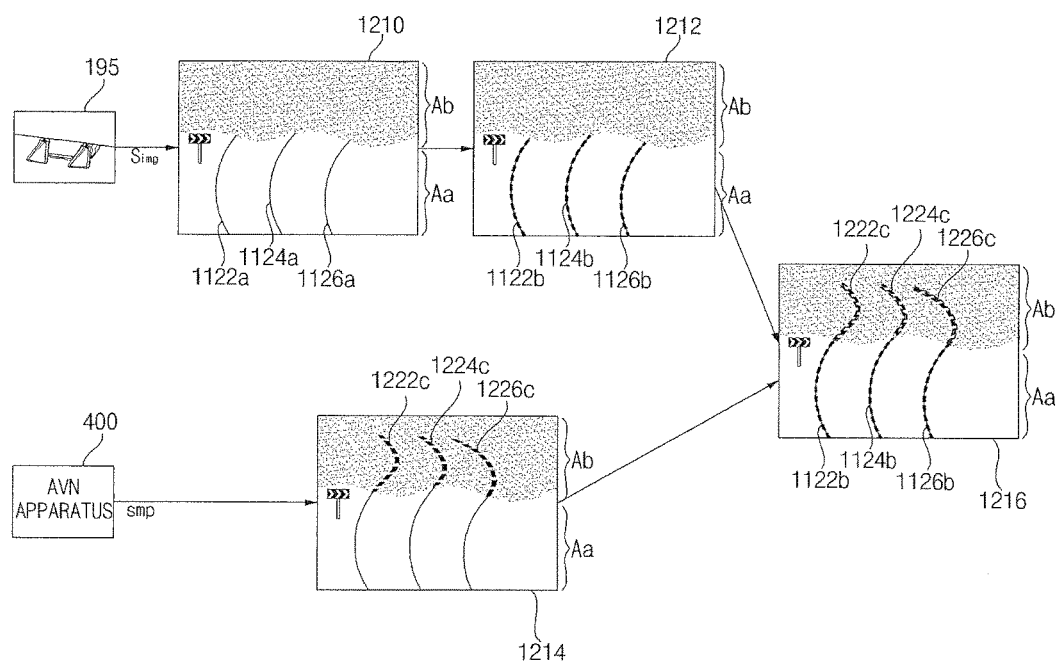

FIG. 12 is a diagram showing an example of a lane detection and lane estimation method of a second curved road.

Using the method similar to FIG. 11, the processor 170 of the vehicle driving assistance device 100 acquires a stereo image 1210 of the front side of the vehicle through the stereo camera 195. The stereo image 1210 may include first to third curved lanes 1122a, 1124a and 1126a.

When the vehicle is driven on a foggy day or at night, only the lane near the vehicle is displayed through the stereo image 1110 of the front side of the vehicle and the lanes of the other area may not be identified.

The stereo image 1210 may be divided into a first area Aa in which lane detection based on an image is possible and a second area Ab in which lane detection is impossible.

The processor 170 of the vehicle driving assistance device 100 may perform lane detection and confirmation by the above-described object detection and confirmation scheme. The lane image of the detected lane may be generated.

The image 1212 of the figure shows the image of the detected lane after detecting the lane of the first area Aa based on the stereo image. Accordingly, the image 1212 shows that the generated first to third lane images 1122b, 1124b and 1126b overlap the actually captured first to third lanes 1122a, 1124a and 126a.

The processor 170 of the vehicle driving assistance device 100 may receive the map information from the AVN apparatus 400 through the interface 130. In addition, the vehicle position information of the sensor information may be received.

The processor 170 of the vehicle driving assistance device 100 performs lane estimation with respect to the second area Ab of the stereo image based on the received map information or the map information and the vehicle position information.

The processor 170 of the vehicle driving assistance device 100 may compare the lane information detected based on the stereo image and the map information Smp received from the interface 130 and identify the second area other than the first area. The lane information of the second area may be acquired from the map information. Based on the acquired lane information, the lane of the second area may be estimated. The lane image of the estimated lane may be generated.

The image 1214 of the figure shows the image of the estimated lane after estimating the lane of the second area Ab based on the map information Smp received from the interface 130. Accordingly, the image 1214 shows that the generated first to third lane images 1222c, 1224c and 1226c are overlapped in the second area Ab.

The processor 170 of the vehicle driving assistance device 100 may output the image 1214, for display on the display 180. Thus, a user can intuitively confirm the lane of the second area.

The processor 170 of the vehicle driving assistance device 100 may combine the image 1212 and the image 1214 to generate an image 1216. The image 1216 shows that the first to third lane images 1122b, 1124b and 1126b based on the detected lane is overlapped in the first area Aa and the first to third lane images 1222c, 1224c and 1226c based on the estimated lane are overlapped.

In the figure, the first to third lane images 1222c, 1224c and 1226c have a curve in the opposite direction of the first curve of the detected lane. That is, the second curved road is an S-shaped curved road.

The processor 170 of the vehicle driving assistance device 100 may output the image 1216, for display on the display 180. Thus, a user can intuitively confirm the lanes of the first area and the second area.

The processor 170 of the vehicle driving assistance device 100 may estimate whether the second curved lane has a curve in the same direction as the first curve or a curve in the opposite direction of the first curve based on the map information upon estimating the second curved lane of the second area, in the curved road shown in FIGS. 11 and 12 and, more particularly, when the first area includes a first curved lane having the first curve.

The first curved road is a C-shaped curved road in FIG. 11, and the second curved road is an S-shaped curved road in FIG. 12. In particular, although the lane detected in the first area has a similar curve, the processor 170 of the vehicle driving assistance device 100 may calculate whether the lane of the second area is a curved lane having a curve in the same direction as the first curve or a curved lane having a curve in the opposite direction of the first curve.

Equation 1 below shows a lane estimation equation applicable to the C-shaped curved road or the S-shaped curved road.

$$y=(dx^3)+ax^2+bx+c \quad \text{Equation 1}$$

where, d denotes a proportional constant for determining a C-shaped curved road or an S-shaped curved road. When d is 0, this indicates the C-shaped curved road and, when d is not 0, this indicates the S-shaped curved road.

In addition, a denotes a curve coefficient, b denotes a slope coefficient and c denotes an offset coefficient.

In the image 1116 or image 1126 displayed on the display, the images 1122c, 1124c and 1126c or 1222c, 1224c and 1226c of the estimated lane are highlighted, unlike the images 1122b, 1124b and 1126b corresponding to the detected lane. For example, the thickness, size and length of the images 1122c, 1124c and 1126c or 1222c, 1224c and 1226c of the estimated lane may be greater than those of the images 1122b, 1124b and 1126b corresponding to the detected lane.

Figure 13A:
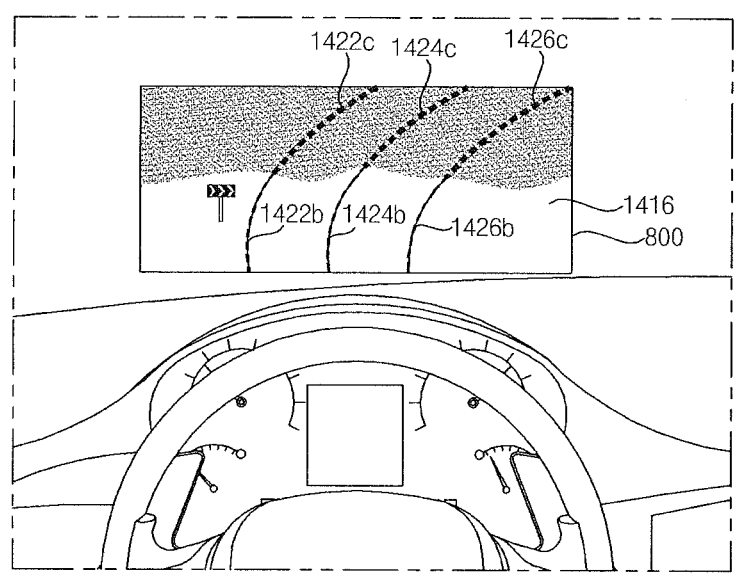

FIG. 13A shows the lane image of the first curved road of FIG. 11.

Referring to the figure, the image 1416 corresponding to the image 1116 of FIG. 11 is displayed in an output area 800 of the windshield. At this time, the display 180 may be a HUD.

The image 1416 may include first to third lane images 1422b, 1424b and 1426b corresponding to the detected lane and first to third lane images 1422c, 1424c and 1426c corresponding to the estimated lane.

When the lane image is displayed on the windshield of the vehicle, the image 1416 based on augmented reality of the front side of the vehicle may be displayed and a user can intuitively recognize the lane of the front road. In particular, it is possible to recognize the lane of the second area which cannot be confirmed.

Figure 13B:
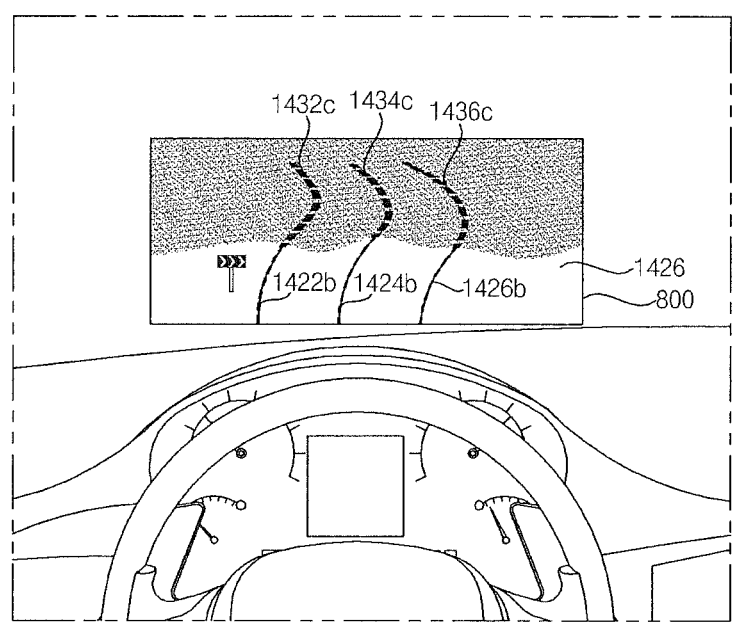

FIG. 13B shows the lane image of the second curved road of FIG. 12.

Referring to the figure, the image 1426 corresponding to the image 1216 of FIG. 12 is displayed in the output area 800 of the windshield of the vehicle. At this time, the display 180 may be a HUD.

The image 1426 may include first to third lane images 1422*b*, 1424*b* and 1426*b* corresponding to the detected lane and first to third lane images 1432*c*, 1434*c* and 1436*c* corresponding to the estimated lane.

The processor 170 of the vehicle driving assistance device 100 may change at least one of the size, thickness, length and color of the first lane image in correspondence with the speed of the vehicle.

More specifically, the processor 170 of the vehicle driving assistance device 100 may increase the rate of change of the first lane image or the curvature of the lane image or the thickness or length of the lane image in proportion to the speed of the vehicle.

FIGS. 14A to 15B show the size of the lane image changed in correspondence with the speed of the vehicle upon displaying the lane image of the curved road.

Figure 14A:
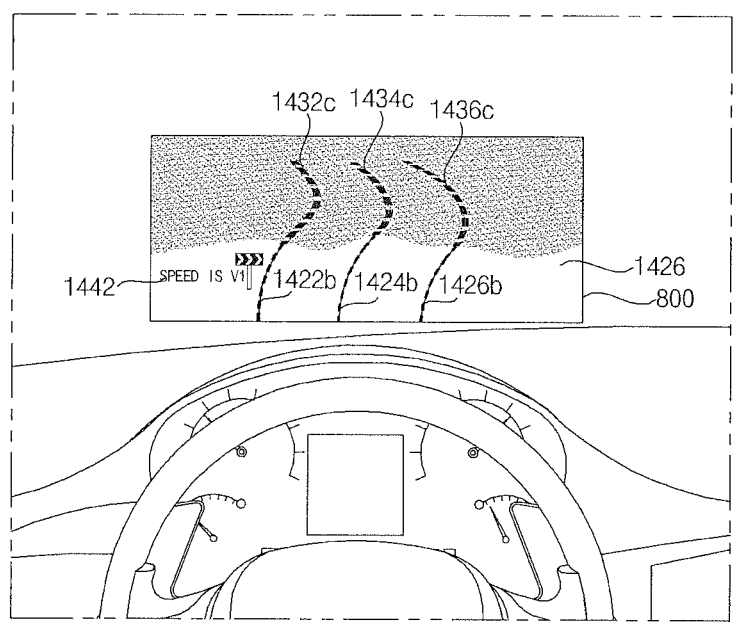

FIG. 14A shows that an image 1426 including first to third lane images 1422*b*, 1424*b* and 1426*b* corresponding to a detected lane, first to third lane images 1432*c*, 1434*c* and 1436*c* corresponding to an estimated lane and vehicle speed information 1422 is displayed in the output area 800 of the windshield of the vehicle when the vehicle is driven at a first speed V1.

Figure 14B:
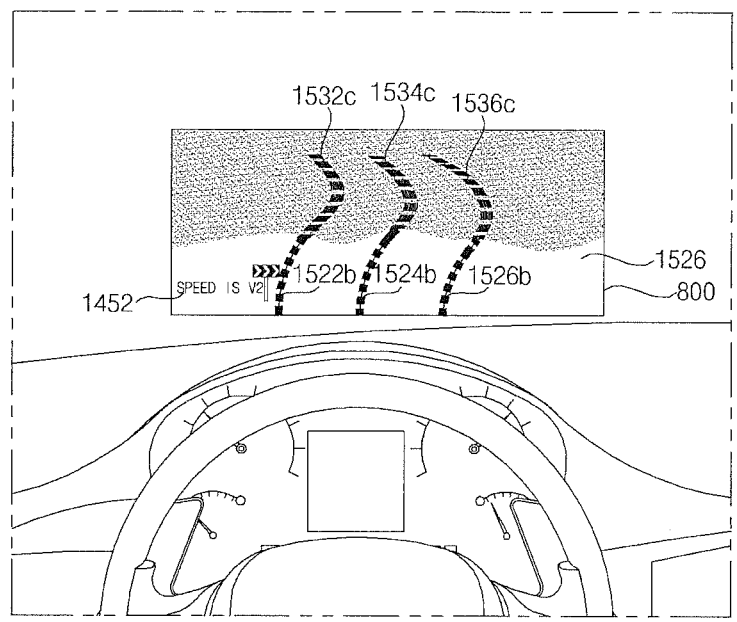

FIG. 14B shows that an image 1526 including first to third lane images 1522*b*, 1524*b* and 1526*b* corresponding to a detected lane, first to third lane images 1532*c*, 1534*c* and 1536*c* corresponding to an estimated lane and vehicle speed information 1452 are displayed in the output area 800 of the windshield of the vehicle when the vehicle is driven at a second speed V2 faster than the first speed V1.

In comparison between FIG. 14A and FIG. 14B, it can be seen that the thicknesses of the first to third lane images 1522*b*, 1524*b* and 1526*b* corresponding to the detected lane and the first to third lane images 1532*c*, 1534*c* and 1536*c* corresponding to the estimated lane of FIG. 14B are greater than those of the first to third lane images 1422*b*, 1424*b* and 1426*b* corresponding to the detected lane and the first to third lane images 1432*c*, 1434*c* and 1436*c* corresponding to the estimated lane of FIG. 14A.

The thickness of the lane image increases in proportion to the speed of the vehicle to improve visibility of a lane image. Further, the speed of the vehicle may be indirectly recognized through the lane image.

Figure 15A:
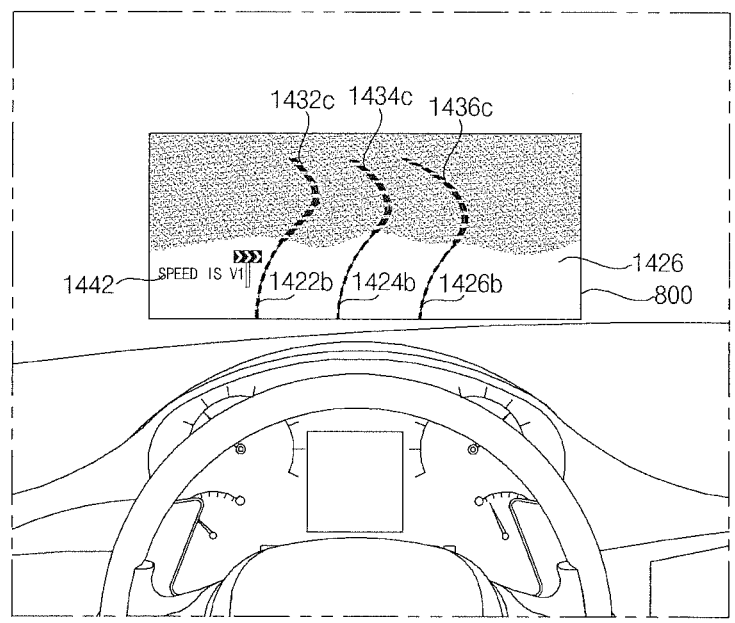

Next, FIG. 15A shows that an image 1426 including first to third lane images 1422*b*, 1424*b* and 1426*b* corresponding to a detected lane, first to third lane images 1432*c*, 1434*c* and 1436*c* corresponding to an estimated lane and vehicle speed information 1442 is displayed in the output area 800 of the windshield of the vehicle when the vehicle is driven at a first speed V1, like FIG. 14A.

Figure 15B:
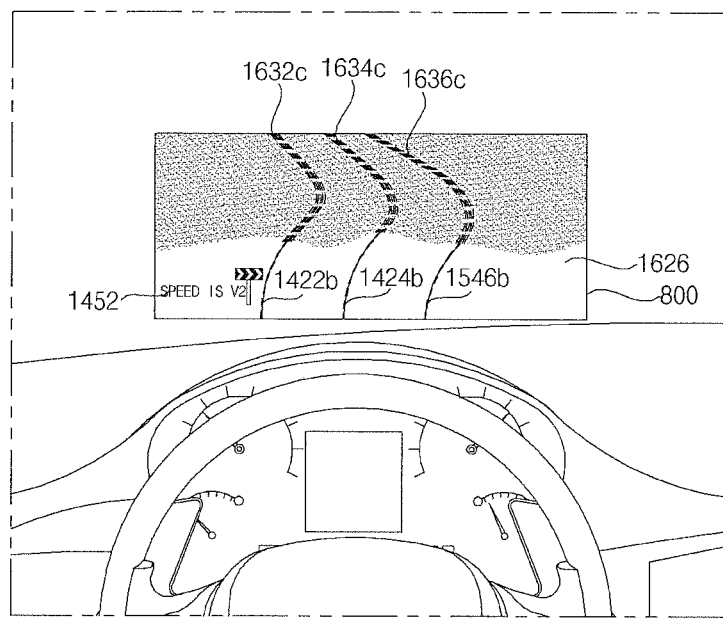

Next, FIG. 15B shows that an image 1626 including first to third lane images 1522*b*, 1524*b* and 1526*b* corresponding to a detected lane, first to third lane images 1632*c*, 1634*c* and 1636*c* corresponding to an estimated lane and vehicle speed information 1452 are displayed in the output area 800 of the windshield of the vehicle when the vehicle is driven at a second speed V2.

In comparison between FIG. 15A and FIG. 15B, it can be seen that the lengths of the first to third lane images 1532*b*, 1534*b* and 1536*b* corresponding to the estimated lane of FIG. 15B are greater than those of the first to third lane images 1432*c*, 1434*c* and 1436*c* corresponding to the estimated lane of FIG. 14A.

The length of the lane image increases in proportion to the speed of the vehicle to improve visibility of a lane image. Further, the speed of the vehicle may be indirectly recognized through the lane image.

The processor 170 of the vehicle driving assistance device 100 may generate a lane departure warning signal or a lane departure avoidance control signal in consideration of the direction of travel of the vehicle, after lane detection and estimation.

Figure 16A:
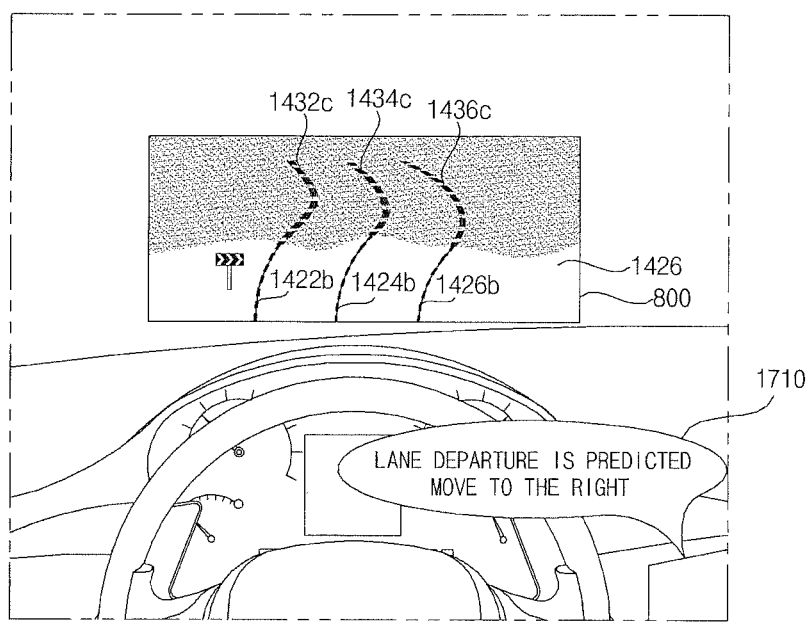
Figure 16B:
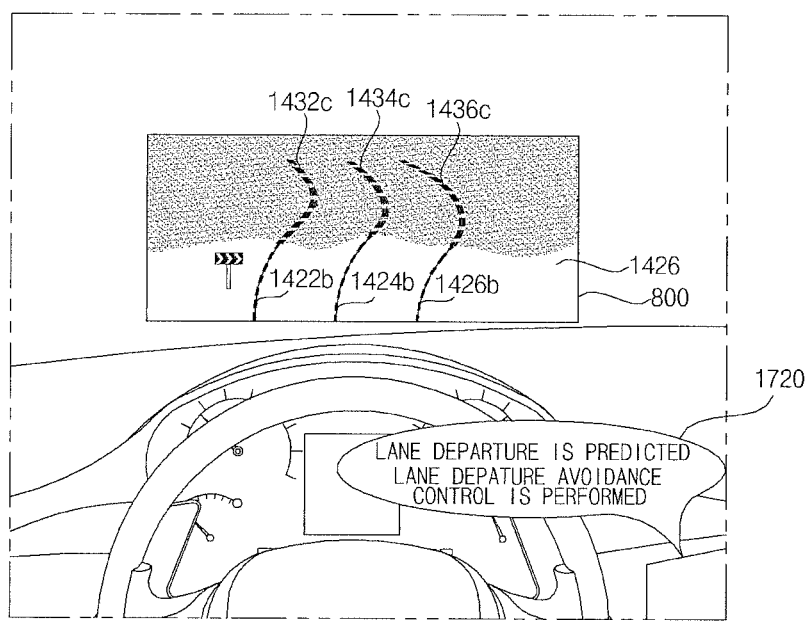

FIGS. 16A to 16B show various examples of lane departure avoidance.

FIG. 16A shows that the processor 170 of the vehicle driving assistance device 100 generates a lane departure warning signal in consideration of the direction of travel of the vehicle after lane detection and estimation.

More specifically, the processor 170 of the vehicle driving assistance device 100 may generate and output the lane departure warning signal as an audio signal. The audio output unit 785 provided inside the vehicle may output sound 1710 shown in the figure. The user may recognize lane departure and manually control lane departure by controlling the steering wheel 150.

Although the image 1426 including the first to third lane images 1422*b*, 1424*b* and 1426*b* corresponding to the detected lane and the first to third lane images 1432*c*, 1434*c* and 1436*c* corresponding to the estimated lane is displayed in the output area 800 of the windshield in the figure, a lane departure warning message may also be displayed.

FIG. 16B shows that the processor 170 of the vehicle driving assistance device 100 generates a lane departure avoidance control signal in consideration of the direction of travel of the vehicle after lane detection and estimation.

More specifically, the processor 170 of the vehicle driving assistance device 100 may generate and output the lane departure avoidance control signal and an audio signal indicating the same. The audio output unit 785 provided inside the vehicle may output sound 1720 shown in the figure. The user may immediately recognize that lane departure avoidance control is performed.

Although the image 1426 including the first to third lane images 1422*b*, 1424*b* and 1426*b* corresponding to the detected lane and the first to third lane images 1432*c*, 1434*c* and 1436*c* corresponding to the estimated lane is displayed in the output area 800 of the windshield in the figure, a lane departure avoidance control related message may also be displayed.

Figure 17:
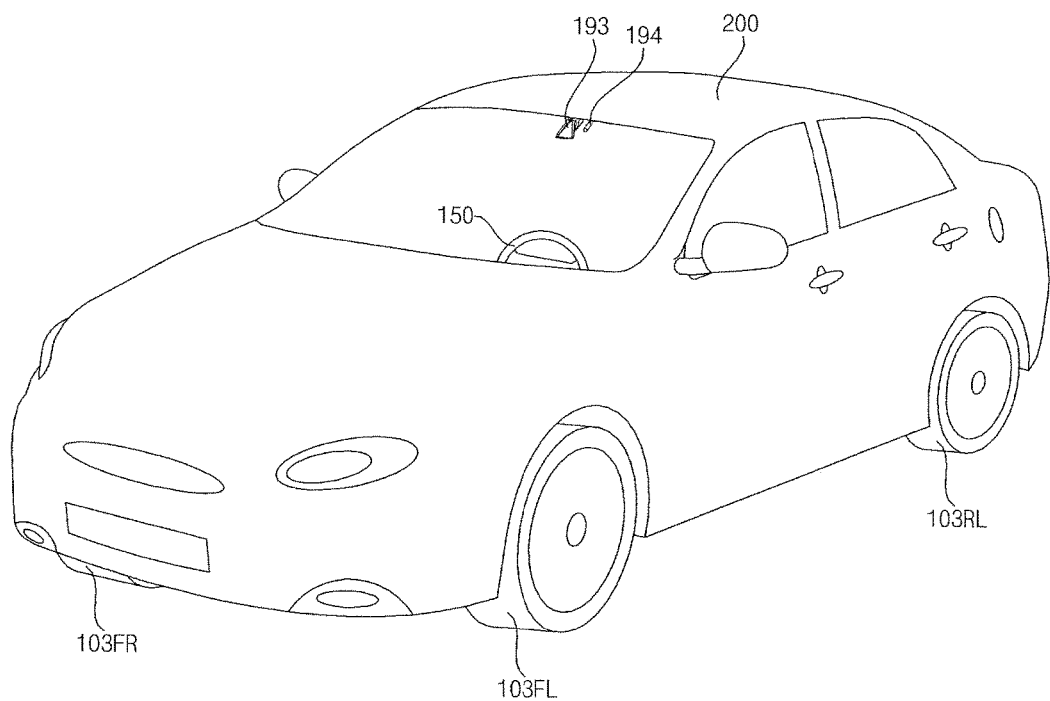
FIG. 17 is a diagram showing the appearance of a vehicle including a mono camera according to another embodiment of the present invention.

FIG. 17 is a diagram showing the appearance of a vehicle including a mono camera according to another embodiment of the present invention.

Referring to the figure, the vehicle 200 according to another embodiment of the present invention may include wheels 135FR, 135FL, 135RL, . . . ) rotated by a power source, a steering wheel 150 for controlling the direction of travel of the vehicle 200, and a mono camera 193 and radar 194 provided inside the vehicle 200.

Figure 18A:
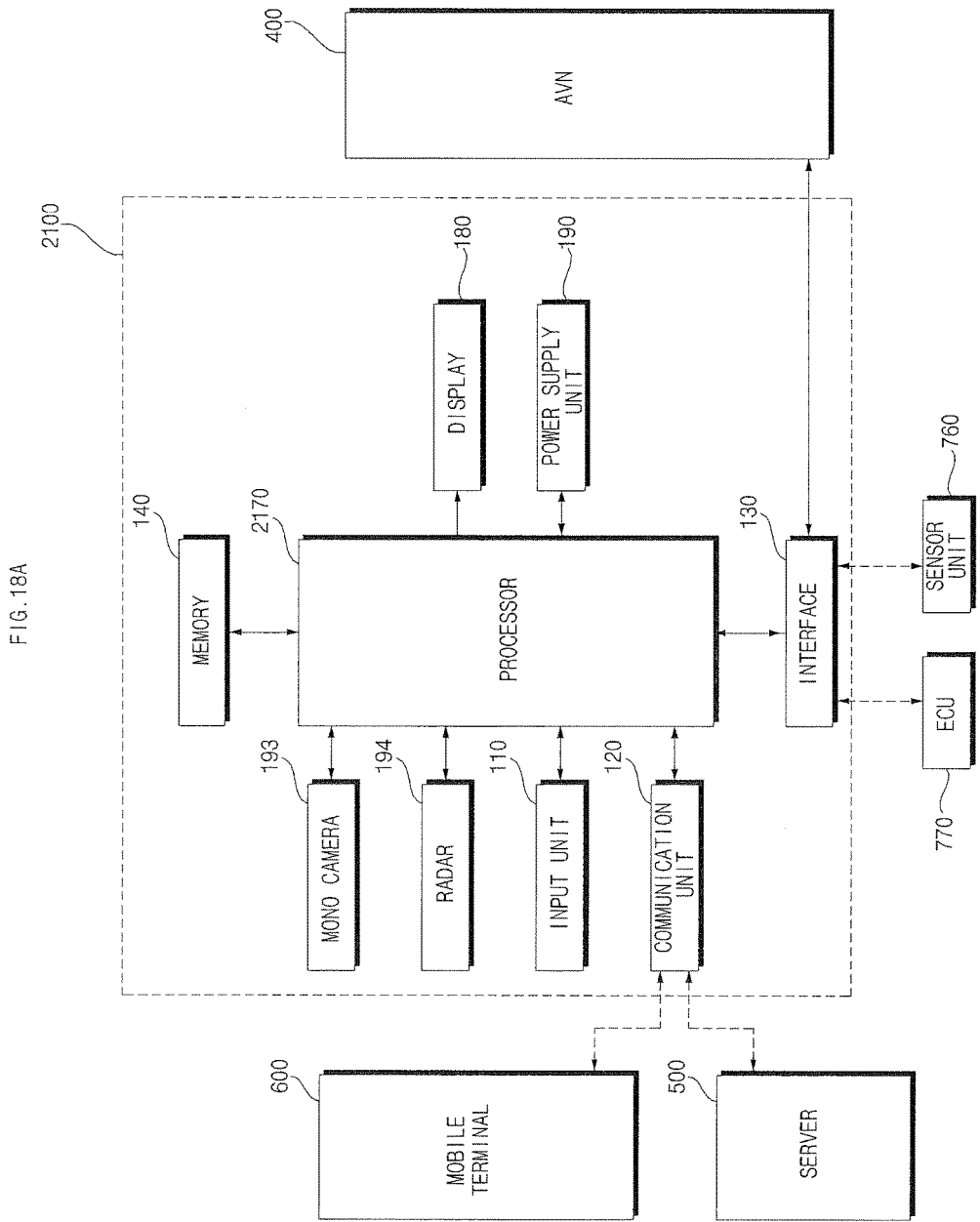
FIG. 18A is a block diagram showing the internal configuration of a vehicle driving assistance device according to another embodiment of the present invention.

A mono image from the mono camera 193 and distance information from the radar 194 may be processed in the vehicle driving assistance device (2100 of FIG. 18A).

FIG. 18A is a block diagram showing an example of the internal configuration of a vehicle driving assistance device according to another embodiment of the present invention.

Referring to the figure, the internal configuration of the vehicle driving assistance device 2100 of FIG. 18A is similar to that of the vehicle driving assistance device 100 of FIG. 3, but is different therefrom in that, instead of the stereo images from the stereo camera 195, signal processing is performed based on the mono image from the mono camera 193 and the distance information from the radar 194. That is, a vehicle attitude control signal may be generated. Hereinafter, only a difference will be described.

The mono camera 193 may be attached to or detached from the ceiling or windshield of the vehicle 200 and may include a single camera including a lens.

The radar 194 may be attached to or detached from the ceiling or windshield of the vehicle 200 and may transmit a wave having a predetermined frequency to the front side of the vehicle and receive a wave reflected from an object located at the front side of the vehicle.

The processor 2170 may calculate distance information based on a difference between the transmitted wave and the received wave of the radar 194. In addition, object segmentation, detection, recognition, etc. may be performed through matching of the mono image from the mono camera 193 and the distance information.

Next, FIG. 18B is a block diagram showing an example of the internal configuration of a vehicle driving assistance device according to another embodiment of the present invention.

Referring to the figure, the internal configuration of the vehicle driving assistance device 2150 of FIG. 18B is similar to that of the vehicle driving assistance device 2100 of FIG. 18A but is different therefrom in that, instead of the mono camera 193 and the radar 194, a Lidar 2101 for scanning an external object is included.

The Lidar 2101 may acquire the scanned image of the front side of the vehicle using a laser scanning method and the processor 2270 may perform signal processing based on the scanned image received from the Lidar. That is, a vehicle attitude control signal may be generated.

Figure 19A:
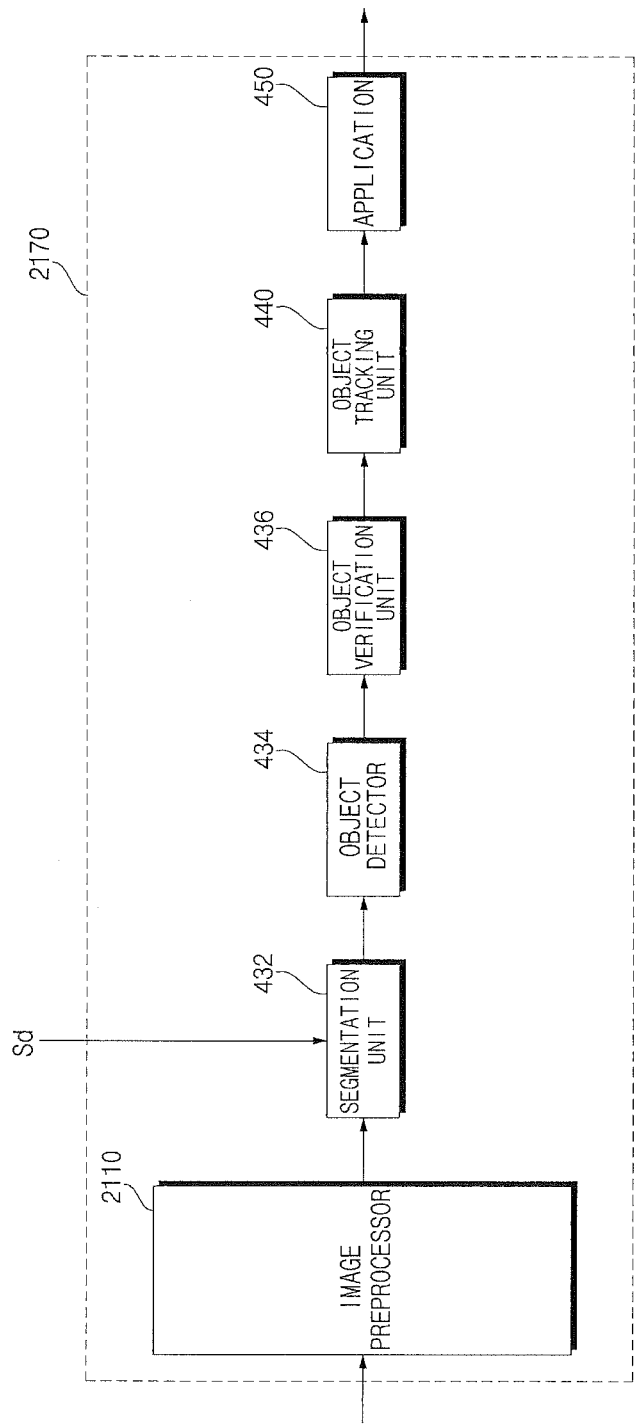
FIGS. 19A to 19B are views showing various examples of the internal configuration of the processor of FIG. 18A.
Figure 19B:
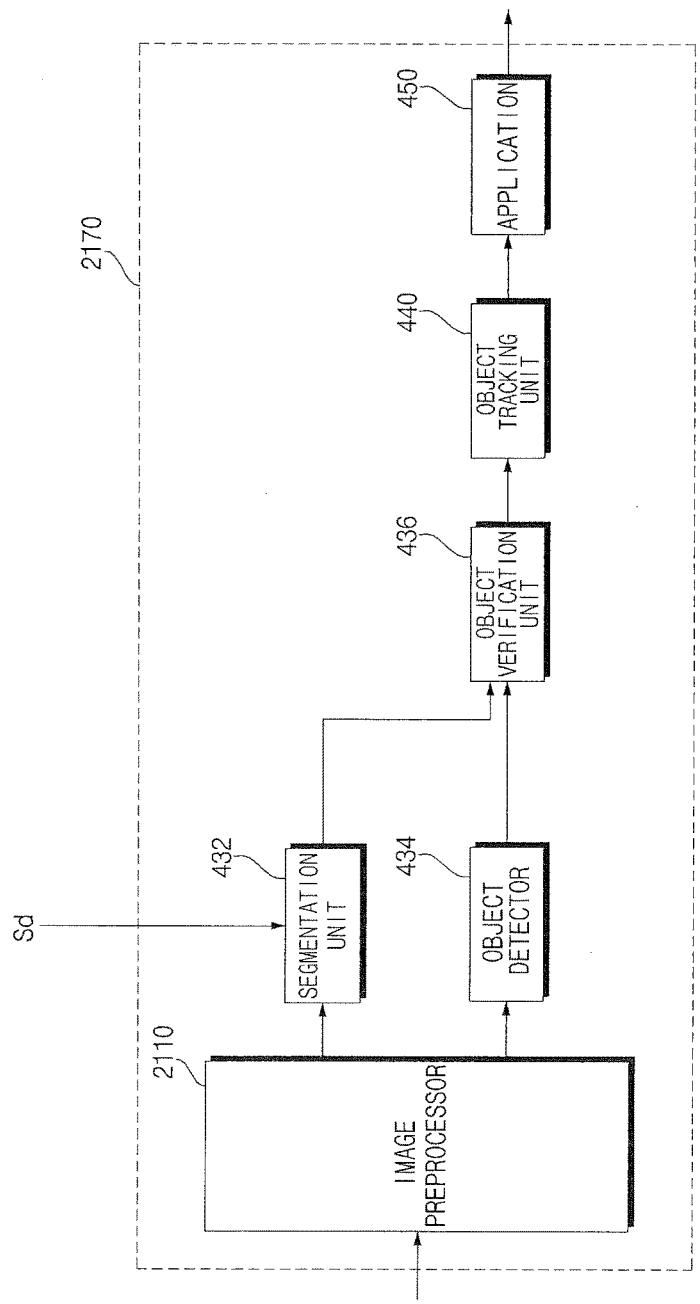
Figure 20A:
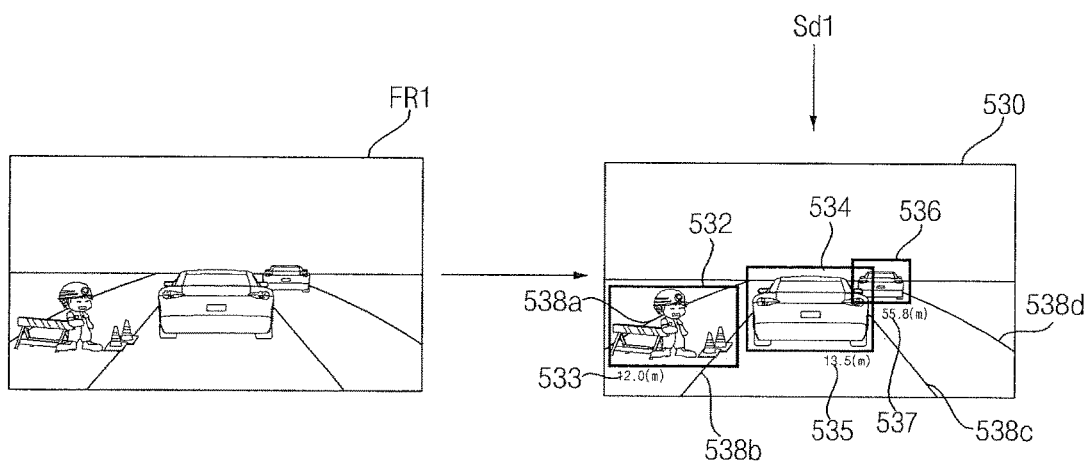
FIGS. 20A to 20B are views referenced to explain operation of the processor of 19A.
Figure 20B:
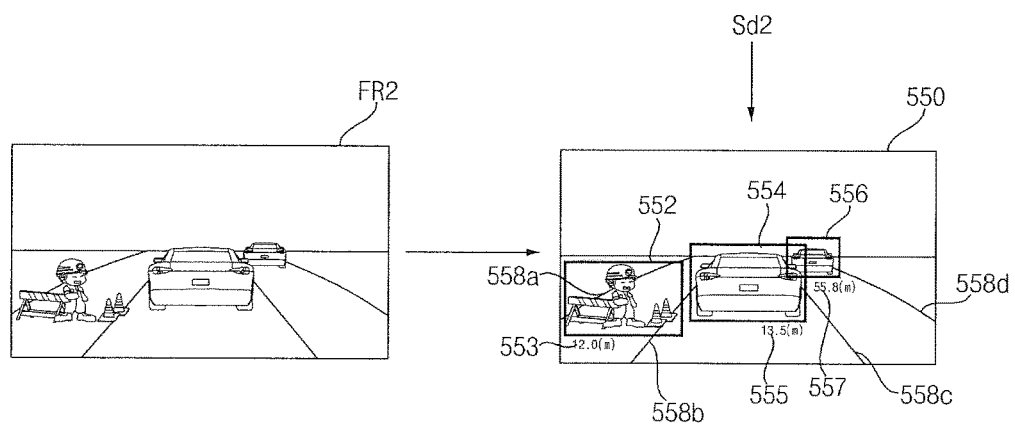

FIGS. 19A to 19B are views showing various examples of the internal configuration of the processor of FIG. 18A, and FIGS. 20A to 20B are views referenced to explain the operation method of the processor of 19A.

The internal configurations of the processors of FIGS. 19A to 19B are similar to those of the processors of FIGS. 4A to 4B, but are different therefrom in that a disparity calculator is not provided.

Instead, distance information Sd corresponding to disparity information is received from the external radar 194. The distance information Sd may be input to the segmentation unit 432 and may be used upon image segmentation.

FIGS. 20A to 20B are views referenced to explain the operation method of the processor 170 of FIG. 19A based on mono images acquired during first and second frame periods.

FIGS. 20A to 20B are similar to FIGS. 5A to 5B but are different therefrom in that a distance map does not need to be generated because the mono image and the distance information from the radar are used.

First, referring to FIG. 20A, during the first frame period, the mono camera 193 acquires a mono image FR1 and the radar acquires distance information Sd1.

The segmentation unit 432, the object detector 434 and the object verification unit 436 of the processor 2170 may detect and verify first to fourth lanes 538a, 538b, 538c and 538d, a construction area 532, a first preceding vehicle 534 and a second preceding vehicle 536 of the mono image FR1 based on the distance information Sd1 from the radar.

Next, referring to FIG. 20B, during the second frame period, the mono camera 193 acquires a mono image FR2 and the radar acquires distance information Sd2.

The segmentation unit 432, the object detector 434 and the object verification unit 436 of the processor 2170 may detect and verify first to fourth lanes 558a, 558b, 558c and 558d, a construction area 552, a first preceding vehicle 554 and a second preceding vehicle 556 of the mono image FR2 based on the distance information Sd2 from the radar.

The object tracking unit 440 may track the verified object through comparison between FIGS. 20A and 20B.

More specifically, the object tracking unit 440 may track movement of the object based on motion or motion vectors of the objects confirmed in FIGS. 20A and 20B. Accordingly, the lane, the construction area, the first preceding vehicle and the second preceding vehicle located in the vicinity of the vehicle may be tracked.

The vehicle driving assistance device 2100 including the mono camera 193 and the radar 194 described with reference to FIGS. 17 to 20B may detect the lane of the first area located at the front side of the vehicle based on the mono image and the distance information and estimate the lane of the second area located at the front side of the vehicle based on the map information from the interface, similarly to FIGS. 8A to 16B.

The processor 2170 of the vehicle driving assistance device 2100 may generate and output a lane image corresponding to the estimated lane.

The processor 2170 of the vehicle driving assistance device 2100 may perform lane departure prediction based on the detected lane and the estimated lane and generate a lane departure avoidance control signal for controlling at least one of the steering drive unit, the brake drive unit, the power source drive unit and the suspension drive unit provided inside the vehicle upon lane departure prediction.

The vehicle driving assistance device 2150 including the Lidar 2101 described with reference to FIG. 18B may detect the lane of the first area located at the front side of the vehicle based on the scanned image and estimate the lane of the second area located at the front side of the vehicle based on the map information from the interface, similarly to FIGS. 8A to 16B.

The processor 2270 of the vehicle driving assistance device 2150 may generate and output a lane image corresponding to the estimated lane.

The processor 2270 of the vehicle driving assistance device 2150 may perform lane departure prediction based on the detected lane and the estimated lane and generate a lane departure avoidance control signal for controlling at least one of the steering drive unit, the brake drive unit, the power source drive unit and the suspension drive unit provided inside the vehicle upon lane departure prediction.

As is apparent from the above description, the vehicle driving assistance device according to an embodiment of the present invention detects the lane of the first area located at the front side of the vehicle based on stereo images received from the stereo camera and estimates the lane of the second area located at the front side of the vehicle based on the map information from the interface. Accordingly, it is possible to confirm the lane located at the front side of the vehicle based on the captured images. In particular, it is possible to estimate the lane of the area which cannot be confirmed with the naked eyes of a user or through the stereo camera.

The lane image corresponding to the estimated lane is generated and displayed on the display, such that the user intuitively confirms the lane of the second area.

At least one of the size, thickness, length and color of the lane image is changed according to the speed of the vehicle, such that the user indirectly recognizes a degree of risk.

Lane departure prediction is performed based on the detected lane and the estimated lane and a lane departure avoidance control signal for controlling at least one of a steering drive unit, a brake drive unit, a power source drive unit and a suspension drive unit provided inside the vehicle is generated upon lane departure prediction, thereby improving stability upon driving the vehicle.

Upon object detection based on the stereo images, disparity is calculated using the stereo images and an object is detected based on disparity information. Accordingly, it is possible to reduce a data processing rate.

The vehicle driving assistance device and the vehicle including the same according to the foregoing embodiments are not restricted to the configuration and method of the embodiments set forth herein. Therefore, some or all of the above-described embodiments may be selectively combined to make various modifications.

The vehicle driving assistance device or the method of operating the vehicle according to the present invention may be implemented as code that can be written to a processor-readable recording medium provided in the vehicle driving assistance device or the vehicle and can thus be read by a processor. The processor-readable recording medium may be any type of recording device in which data can be stored in a computer-readable manner. Examples of the processor-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and executed therefrom in a decentralized manner. Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle driving assistance device comprising:
a head-up display (HUD) comprising a projection module configured to project an image onto an output area of a windshield of a vehicle;
a stereo camera;
an interface configured to exchange data with at least one device provided inside the vehicle; and
at least one processor configured to:
  detect a lane of a first area located at a front side of the vehicle based on stereo images received from the stereo camera; and
  estimate a lane of a second area located at the front side of the vehicle based on map information received from the interface,
wherein the at least one processor is further configured to:
  in a first state in which the vehicle is driven at a first speed, control the HUD to display, in the output area of the windshield of the vehicle, a first lane image corresponding to the estimated lane and a second lane image corresponding to the detected lane; and
  in a second state in which the vehicle is driven at a second speed greater than the first speed, control the HUD to display, in the output area of the windshield of the vehicle, a third lane image corresponding to the estimated lane and a fourth lane image corresponding to the detected lane,
  wherein a length of the third lane image displayed in the second state is greater than a length of the first lane image displayed in the first state.

2. The vehicle driving assistance device according to claim 1, wherein the at least one processor is configured to estimate the lane of the second area based on vehicle position information received from the interface in addition to the map information.

3. The vehicle driving assistance device according to claim 1, wherein the at least one processor is configured to estimate the lane of the second area based on the detected lane of the first area.

4. The vehicle driving assistance device according to claim 1, wherein the at least one processor is further configured to:
determine whether the first area includes a first curved lane having a first curve; and
based on a determination that the first area includes the first curved lane having the first curve:
  estimate a second curved lane of the second area; and
  estimate, based on the map information and based on the estimated second curved lane, whether the second curved lane has a second curve in a direction that either corresponds or is opposite to a direction of the first curve of the first curved lane.

5. The vehicle driving assistance device according to claim 1, wherein the at least one processor is further configured to:
determine a speed of the vehicle; and
change, in correspondence with the determined speed of the vehicle, at least one of a size, a thickness, a length, or a color of the first lane image.

6. The vehicle driving assistance device according to claim 1, wherein the at least one processor is further configured to:
determine a speed of the vehicle; and
increase, in proportion to the determined speed of the vehicle, at least one of a rate of change of the first lane image, a curvature of the lane image, a thickness of the lane image, or a length of the lane image.

7. The vehicle driving assistance device according to claim 1, wherein the at least one processor comprises:
a disparity calculator configured to calculate disparity information of the stereo images;
an object detector configured to detect an object from at least one of the stereo images based on the disparity information of the stereo images; and
an object tracking unit configured to track the detected object.

8. The vehicle driving assistance device according to claim 7, wherein the at least one processor further comprises:
a segmentation unit configured to generate a segmentation of the stereo images based on the disparity information of the stereo images; and
an object verification configured to classify the detected object, wherein the object detector is configured to detect the object from at least one of the stereo images based on the generated segmentation of the stereo images.

9. The vehicle driving assistance device according to claim 1, wherein the at least one processor is configured to:
perform lane departure prediction based on the detected lane and the estimated lane; and
generate, based on performing the lane departure prediction, a lane departure avoidance control signal that controls at least one of a steering drive unit, a brake drive unit, a power source drive unit, or a suspension drive unit provided inside the vehicle.

10. The vehicle driving assistance device according to claim 9, wherein:
the interface is configured to receive sensor information of the vehicle, and
the at least one processor is configured to:
detect, based on the stereo images, image-based vehicle surrounding information regarding the lane, a road surface, distance information of a peripheral vehicle, and speed information of the peripheral vehicle,
estimate vehicle motion based on the sensor information,
track a direction of travel of the vehicle based on the detected image-based vehicle surrounding information,
predict a vehicle path based on the estimated vehicle motion and the tracked direction of travel,
determine a lane departure event based on the estimated vehicle motion and the predicted vehicle path, and
generate the lane departure avoidance control signal based on the determined lane departure event.

11. The vehicle driving assistance device according to claim 10, wherein:
the interface is further configured to receive the map information, and
the at least one processor is configured to:
determine vehicle driving information;
perform map matching based on the map information and the vehicle driving information, and
track the direction of travel of the vehicle based on the map information, in addition to the detected image-based vehicle surrounding information.

12. A vehicle driving assistance device comprising:
a head-up display (HUD) comprising a projection module configured to project an image onto an output area of a windshield of a vehicle;
a mono camera;
a radar;
an interface configured to exchange data with at least one device provided inside the vehicle; and
at least one processor configured to:
detect a lane of a first area located at a front side of the vehicle based on a mono image received from the mono camera and based on distance information received from the radar; and
estimate a lane of a second area located at the front side of the vehicle based on map information received from the interface,
wherein the at least one processor is further configured to:
in a first state in which the vehicle is driven at a first speed, control the HUD to display, in the output area of the windshield of the vehicle, a first lane image corresponding to the estimated lane and a second lane image corresponding to the detected lane; and
in a second state in which the vehicle is driven at a second speed greater than the first speed, control the HUD to display, in the output area of the windshield of the vehicle, a third lane image corresponding to the estimated lane and a fourth lane image corresponding to the detected lane,
wherein a length of the third lane image displayed in the second state is greater than a length of the first lane image displayed in the first state.

13. A vehicle driving assistance device comprising:
a head-up display (HUD) comprising a projection module configured to project an image onto an output area of a windshield of a vehicle;
a Lidar configured to scan an external object;
an interface configured to exchange data with at least one device provided inside the vehicle; and
at least one processor configured to:
detect a lane of a first area located at a front side of the vehicle based on a scanned image received from the Lidar; and
estimate a lane of a second area located at the front side of the vehicle based on map information received from the interface,
wherein the at least one processor is further configured to:
in a first state in which the vehicle is driven at a first speed, control the HUD to display, in the output area of the windshield of the vehicle, a first lane image corresponding to the estimated lane and a second lane image corresponding to the detected lane; and
in a second state in which the vehicle is driven at a second speed greater than the first speed, control the HUD to display, in the output area of the windshield of the vehicle, a third lane image corresponding to the estimated lane and a fourth lane image corresponding to the detected lane,
wherein a length of the third lane image displayed in the second state is greater than a length of the first lane image displayed in the first state.

14. A vehicle comprising:
a sensor unit configured to sense a vehicle state;
a steering drive unit configured to drive a steering apparatus;
a brake drive unit configured to drive a brake apparatus;
a power source drive unit configured to drive a power source;
a suspension drive unit configured to drive a suspension apparatus;
a controller configured to control the steering drive unit, the brake drive unit, the power source drive unit, and the suspension drive unit; and
a vehicle driving assistance device comprising:
a head-up display (HUD) comprising a projection module configured to project an image onto an output area of a windshield of the vehicle;
a stereo camera,
an interface configured to exchange data with at least one device provided inside a vehicle, and
at least one processor configured to:
detect a lane of a first area located at a front side of the vehicle based on stereo images received from the stereo camera; and
estimate a lane of a second area located at the front side of the vehicle based on map information received from the interface,
wherein the at least one processor is further configured to:
in a first state in which the vehicle is driven at a first speed, control the HUD to display, in the output area of the windshield of the vehicle, a first lane image corresponding to the estimated lane and a second lane image corresponding to the detected lane; and in a second state in which the vehicle is driven at a second speed greater than the first speed, control the HUD to display, in the output area of the windshield of the vehicle, a third lane image corresponding to the estimated lane and a fourth lane image corresponding to the detected lane, wherein a length of the third lane image displayed in the second state is greater than a length of the first lane image displayed in the first state.

15. The vehicle according to claim 14, wherein the at least one processor is further configured to:

determine whether the first area includes a first curved lane having a first curve; and based on a determination that the first area includes the first curved lane having the first curve:

estimate a second curved lane of the second area; and estimate, based on the map information and based on the estimated second curved lane, whether the second curved lane has a second curve in a direction that either corresponds or is opposite to a direction of the first curve of the first curved lane.

16. The vehicle according to claim 14, wherein the at least one processor is further configured to:

determine a speed of the vehicle; and change, in correspondence with the determined speed of the vehicle, at least one of a size, a thickness, a length, or a color of the first lane image.

17. The vehicle according to claim 14, wherein the at least one processor is configured to:

perform lane departure prediction based on the detected lane and the estimated lane; and generate, based on performing the lane departure prediction, a lane departure avoidance control signal that controls at least one of a steering drive unit, a brake drive unit, a power source drive unit, or a suspension drive unit provided inside the vehicle.

* * * * *